(12) United States Patent  
Chang et al.

(10) Patent No.: US 8,833,952 B2  
(45) Date of Patent: Sep. 16, 2014

(54) DISPLAY APPARATUS INCLUDING RECESSED COLOR FILTERS

(75) Inventors: Jong-Woong Chang, Asan-si (KR); Chul Huh, Yongin-Si (KR); Kyong-Sik Choi, Cheonsan-si (KR); Sang-Hun Lee, Suwon-si (KR); Yui-Ku Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/594,641

(22) Filed: Aug. 24, 2012

(65) Prior Publication Data

US 2013/0077284 A1  Mar. 28, 2013

(30) Foreign Application Priority Data

Sep. 23, 2011  (KR) .................. 10-2011-0096048

(51) Int. Cl.  
  *G02B 5/30* (2006.01)  
  *G02B 27/01* (2006.01)  
  *G02F 1/1335* (2006.01)

(52) U.S. Cl.  
  CPC .... *G02B 27/0101* (2013.01); *G02B 2027/0112* (2013.01); *G02B 2027/0118* (2013.01); *G02F 1/133514* (2013.01); *G02B 5/30* (2013.01)  
  USPC ............................ 362/19; 349/106

(58) Field of Classification Search  
  USPC .............................. 349/106, 113, 114; 362/19  
  See application file for complete search history.

(56) References Cited

U.S. PATENT DOCUMENTS

| | | | | |
|---|---|---|---|---|
| 4,957,350 A * | 9/1990 | Ito et al. | | 349/108 |
| 5,122,891 A * | 6/1992 | Kim | | 349/106 |
| 5,731,111 A * | 3/1998 | Yamada et al. | | 430/7 |
| 6,100,953 A * | 8/2000 | Kim et al. | | 349/129 |
| 6,124,909 A * | 9/2000 | Miyashita et al. | | 349/109 |
| 6,501,521 B2 * | 12/2002 | Matsushita et al. | | 349/106 |
| 6,788,367 B2 * | 9/2004 | Chang et al. | | 349/114 |
| 6,885,418 B2 * | 4/2005 | Matsushita et al. | | 349/113 |
| 2002/0101552 A1 * | 8/2002 | Yi et al. | | 349/106 |
| 2002/0126238 A1 * | 9/2002 | Matsushita et al. | | 349/106 |
| 2002/0196395 A1 * | 12/2002 | Ha | | 349/113 |
| 2003/0007112 A1 * | 1/2003 | Matsushita et al. | | 349/106 |
| 2004/0095527 A1 * | 5/2004 | Liao | | 349/106 |
| 2004/0141118 A1 * | 7/2004 | Chang et al. | | 349/114 |
| 2004/0223101 A1 * | 11/2004 | Yeh et al. | | 349/114 |
| 2012/0038868 A1 * | 2/2012 | Jun et al. | | 349/114 |

FOREIGN PATENT DOCUMENTS

| | | | | |
|---|---|---|---|---|
| JP | 08179312 A | * | 7/1996 | .......... G02F 1/1335 |
| JP | 2008-310332 | | 12/2008 | |
| KR | 10-2007-0065072 A | | 6/2007 | |
| KR | 10-2007-0092446 A | | 9/2007 | |

OTHER PUBLICATIONS

English Translation of JP08-179312, published Jul. 1996.*

* cited by examiner

*Primary Examiner* — Mary Ellen Bowman  
(74) *Attorney, Agent, or Firm* — Innovation Counsel LLP

(57) ABSTRACT

A display apparatus includes a display panel, a light source, a polarizer, and a transparent reflective element. The display panel includes a color filter including a first portion and a second portion in a pixel area. The first portion has a first light transmittance. The second portion has a second light transmittance higher than the first light transmittance. The light source provides a light to the display panel. The polarizer is disposed between the light source and the display. The polarizer polarizes the light. The transparent reflective element is spaced apart from the display panel. The transparent reflective element reflects an image provided from the display panel.

34 Claims, 20 Drawing Sheets

DISPLAY APPARATUS INCLUDING RECESSED COLOR FILTERS

CROSS-REFERENCE TO RELATED APPLICATION

This application claims priority to and benefit of Korean Patent Application No. 10-2011-0096048, filed on Sep. 23, 2011, and all the benefits accruing therefrom under 35 U.S.C. §119, the contents of which are herein incorporated by reference in their entirety.

BACKGROUND OF THE INVENTION

1. Field of the Invention

Example embodiments of the present invention relate to a display apparatus that includes color filters. More particularly, example embodiments of the present invention relate to a display apparatus that includes a display panel having recessed color filters for providing light transmittance and color reproducibility suitable for applications of a transparent display technique that combines images of virtual objects and real objects.

2. Description of the Related Art

Recently, a transparent display technique that combines images of virtual objects and (images of) real objects to produce dramatic effects has been used in exhibitions, magic shows, and launching shows.

A conventional display panel for a liquid crystal display apparatus typically has a relatively low light transmittance. Therefore, the conventional display panel may not be suitable for the transparent display technique, which typically requires a high luminance.

To increase light transmittance, a transparent display apparatus having no color filter layers has been implemented. Nevertheless, the transparent display apparatus having no color filter layers does not display a color image.

On the other hand, if the material of a color filter is changed to adjust light transmittance and color reproducibility, a new production line for the changed color filter material is typically required. As a result, manufacturing cost may be increased.

SUMMARY OF THE INVENTION

Example embodiments of the present invention provide a display apparatus that includes a display panel having recessed color filters for providing light transmittance and color reproducibility suitable for applications of a transparent display technique that combines images of virtual objects and real objects. The recessed color filters may include recess portions and/or through-hole portions for enhancing luminance.

In an example embodiment of a display apparatus according to the present invention, the display apparatus includes a display panel, a light source, a polarizer and a transparent reflective element. The display panel includes a color filter including a first portion and a second portion in a pixel area. The first portion has a first light transmittance. The second portion has a second light transmittance higher than the first light transmittance. The first and second portions are in the same color filter. The light source provides a light to the display panel. The polarizer is disposed between the light source and the display. The polarizer polarizes the light. The transparent reflective element is spaced apart from the display panel. The transparent reflective element reflects an image provided from the display panel.

In an example embodiment, the second portion of the color filter may be a hole.

In an example embodiment, the second portion of the color filter may be thinner than the first portion.

In an example embodiment, a longer side of the second portion of the color filter may be substantially parallel to a longer side of the color filter.

In an example embodiment, the longer side of the second portion of the color filter may extend from a first shorter side of the color filter to a second shorter side of the color filter facing the first shorter side.

In an example embodiment, a longer side of the second portion of the color filter may be substantially parallel to a shorter side of the color filter In an example embodiment, the longer side of the second portion of the color filter may extend from a first longer side of the color filter to a second longer side of the color filter facing the first longer side.

In an example embodiment, a plurality of light-transmitting portions of the color filter is disposed in a single pixel area, and the light transmittance of each light-transmitting portion of the plurality of light-transmitting portions is higher than the first light transmittance.

In an example embodiment, the light-transmitting portions of the color filter may be disposed along a longitudinal direction of the color filter.

In an example embodiment, the display apparatus may include a control part adjusting at least one of a luminance of the light source and a grayscale of the image to control the transparency of the transparent reflective element based on an intensity of an external light.

In an example embodiment, the transparent reflective element may have a curved surface.

In an example embodiment, the transparent reflective element may include a transparent material having a refractive index equal to or greater than 1.

In an example embodiment, the transparent reflective element may include at least one of a glass material, an acrylic material, and a polycarbonate material.

In an example embodiment, the light provided from the display panel to the transparent reflective element may have an incident angle of Brewster's angle, which is $IA=\tan^{-1} n$. IA is the incident angle. n is the refractive index of the transparent reflective element.

In an example embodiment, a longer side of the second portion of the color filter may be inclined with respect to a shorter side of the color filter.

In an example embodiment, the second portion of the color filter may be defined as a plurality of slit patterns of the first portion.

In an example embodiment, the pixel area may be divided into a first domain and a second domain. At least a first part of the second portion of the color filter may be disposed in the first domain. At least a second part of the second portion of the color filter may be disposed in the second domain.

In an example embodiment, the first part of the second portion in the first domain may be larger than the second part of the second portion in the second domain (when the first domain is larger than the second domain).

In an example embodiment, the transparent display apparatus may further include an overcoating layer disposed on the first portion of the color filter and the second portion of the color filter.

In an example embodiment, the color filter may include a first filter presenting a first color and a second filter presenting a second color different from the first color. A size of the first filter may be different from a size of the second filter.

In an example embodiment, the color filter may include a first filter presenting a first color and a second filter presenting a second color different from the first color. The first filter includes a first light-filtering portion and a first light-transmitting portion. The transmittance of the first light-transmitting portion is higher than the transmittance of the first light-filtering portion. The second filter includes a second light-filtering portion and a second light-transmitting portion. The transmittance of the second light-transmitting portion is higher than the transmittance of the second light-filtering portion. The size of the second light-transmitting portion is different from the size of the first light-transmitting portion.

In an example embodiment of a transparent display apparatus according to the present invention, the transparent display apparatus includes a display panel, a first polarizer and a second polarizer. The display panel includes a color filter including a first portion and a second portion in a pixel area. The first portion has a first light transmittance. The second portion has a second light transmittance higher than the first light transmittance. The first and second portions are in the same color filter. The first polarizer is disposed on a first surface of the display panel. The first polarizer polarizes an external light to generate a polarized light. The first polarizer provides the polarized light to the display panel. The second polarizer is disposed on a second surface of the display panel opposite to the first surface. The second polarizer polarizes an image provided from the display panel.

In the example embodiment, the second portion of the color filter may be a hole.

In an example embodiment, the second portion of the color filter may be thinner than the first portion.

In an example embodiment, a longer side of the second portion of the color filter may be substantially parallel to a longer side of the color filter.

In an example embodiment, a longer side of the second portion of the color filter may be substantially parallel to a shorter side of the color filter In an example embodiment, a plurality of light-transmitting portions of the color filter is disposed in a single pixel area, and light transmittance of each light-transmitting portion of the plurality of light-transmitting portions is higher than the first light transmittance.

In an example embodiment, a longer side of the second portion of the color filter may be inclined with respect to a shorter side of the color filter.

In an example embodiment, the second portion of the color filter may be defined as a plurality of slit patterns of the first portion.

In an example embodiment, the pixel area may be divided into a first domain and a second domain. At least a first part of the second portion of the color filter may be disposed in the first domain. At least a second part of the second portion of the color filter may be disposed in the second domain.

In an example embodiment, the second portion in the first domain may be larger than the second portion in the second domain when the first domain is larger than the second domain.

In an example embodiment, the transparent display apparatus may further include an overcoating layer disposed on the first portion of the color filter and the second portion of the color filter.

In an example embodiment, the color filter may include a first filter presenting a first color and a second filter presenting a second color different from the first color. A size of the first filter may be different from a size of the second filter.

In an example embodiment, the color filter may include a first filter presenting a first color and a second filter presenting a second color different from the first color. The first filter includes a first light-filtering portion and a first light-transmitting portion. The transmittance of the first light-transmitting portion is higher than the transmittance of the first light-filtering portion. The second filter includes a second light-filtering portion and a second light-transmitting portion. The transmittance of the second light-transmitting portion is higher than the transmittance of the second light-filtering portion. A size of the second light-transmitting portion is different from a size of the first light-transmitting portion.

According to the transparent display apparatus, the transparent display apparatus includes a display panel having a color filter so that the transparent display apparatus may display a transparent color image. In addition, the transparent display apparatus includes a display panel having recessed color filters for providing a light transmittance and a color reproducibility suitable for applications of a transparent display technique that combines images of virtual objects and real objects. Furthermore, a conventional material may be used for manufacturing the color filter. Therefore, a conventional product line for a non-transparent display apparatus may be used to produce the transparent display apparatus. Advantageously, the manufacturing cost of the transparent display apparatus may not be substantially increased.

BRIEF DESCRIPTION OF THE DRAWINGS

The above and other features and advantages of the present invention will become more apparent by describing in detailed example embodiments thereof with reference to the accompanying drawings, in which.

Figure 9A:
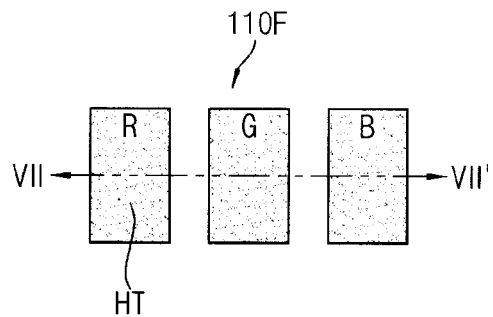
FIG. 9A is a plan view illustrating a color filter unit according to an example embodiment of the present invention; FIG.
Figure 10A:
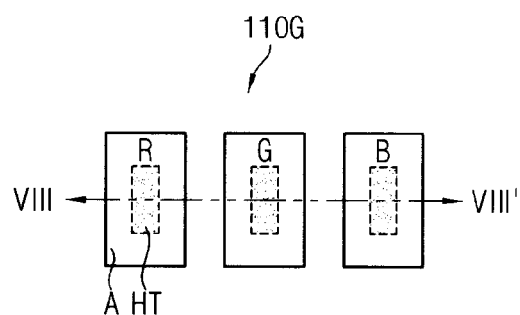
Figure 10B:
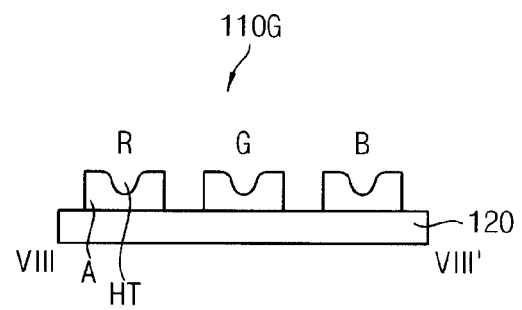
Figure 11A:
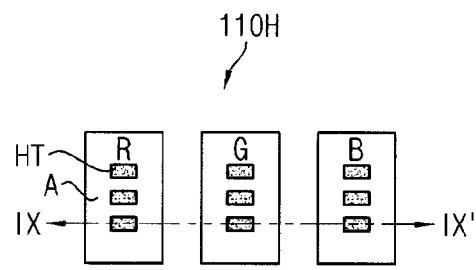
Figure 11B:
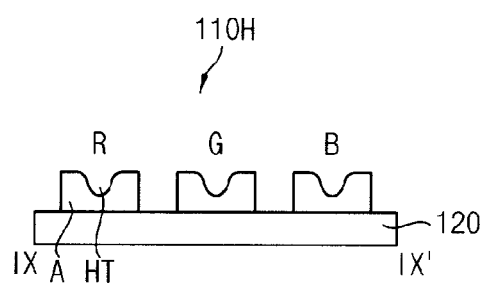
Figure 12A:
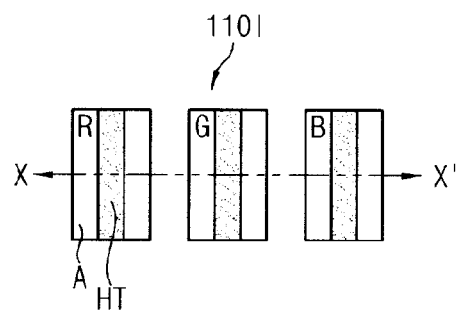
Figure 12B:
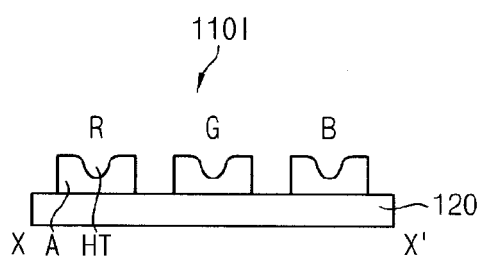
Figure 13A:
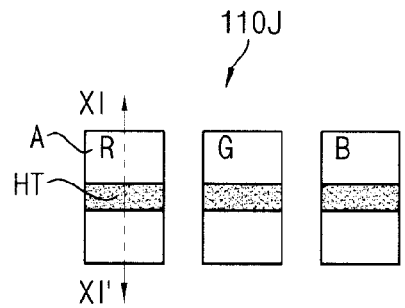
Figure 13B:
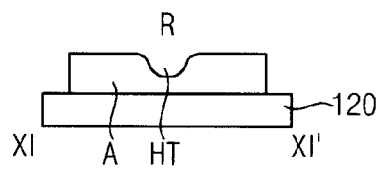
Figure 14A:
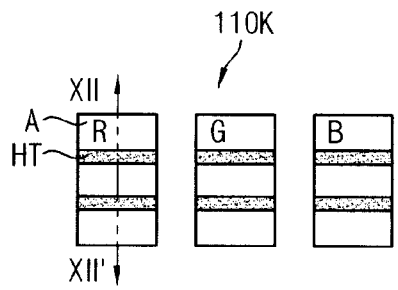
Figure 14B:
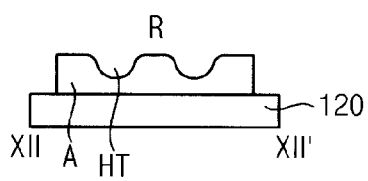
Figure 15A:
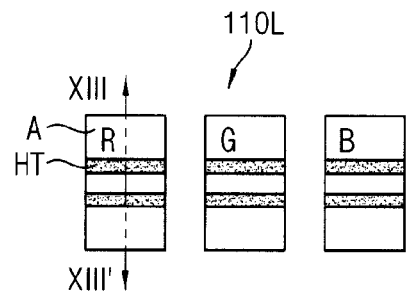
Figure 15B:
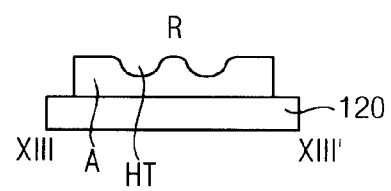
Figure 16:
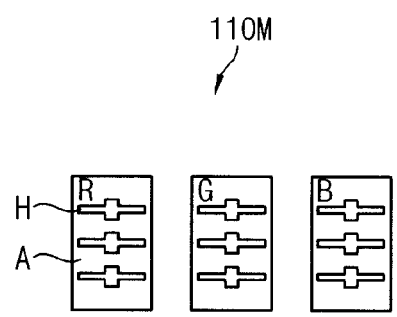
Figure 17:
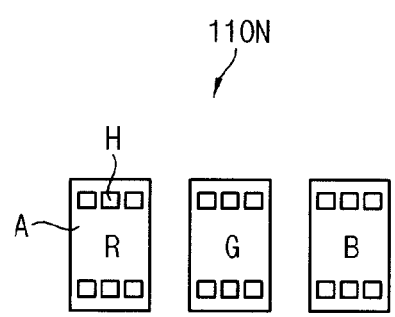
Figure 18:
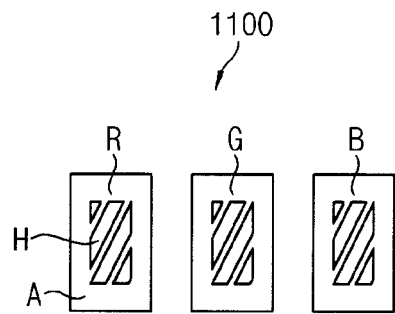
Figure 19A:
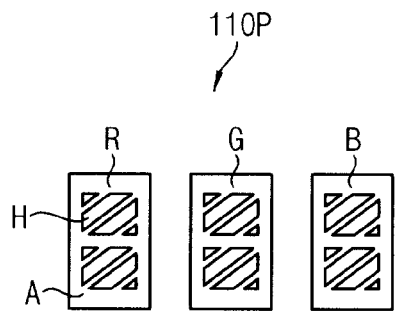
Figure 19B:
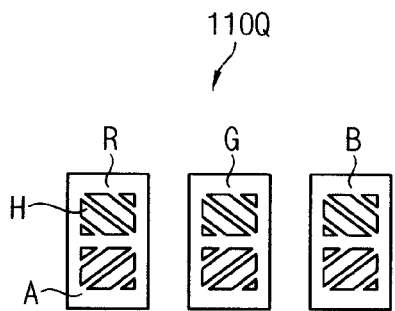
Figure 20A:
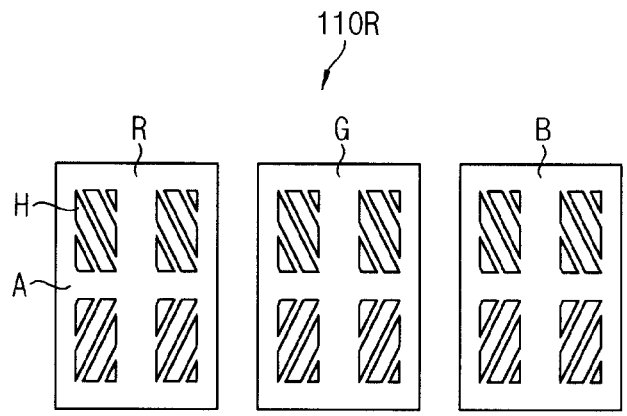
Figure 20B:
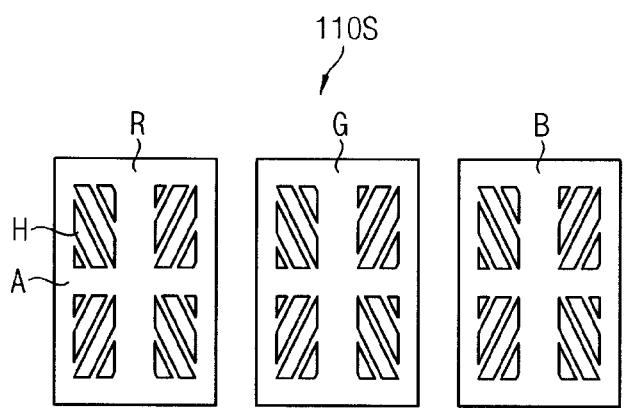
Figure 21:
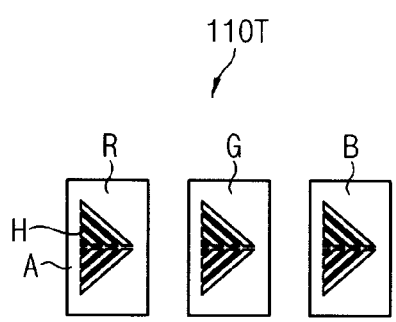
Figure 22:
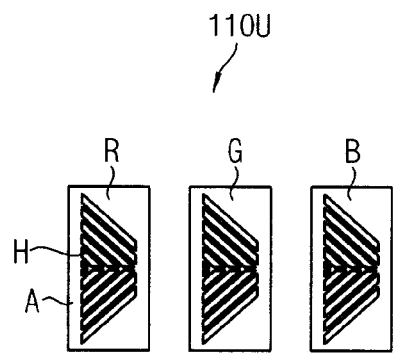
Figure 23:
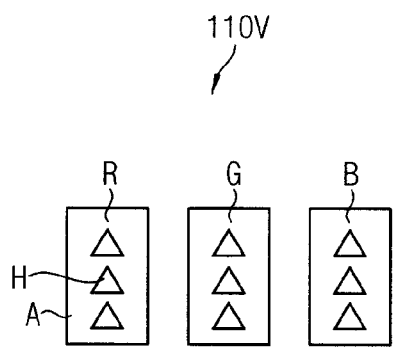
Figure 24:
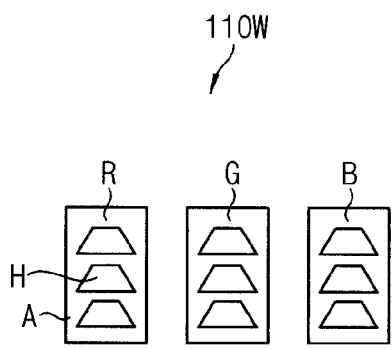
Figure 25:
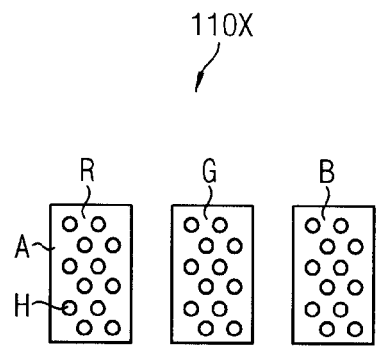
Figure 26:
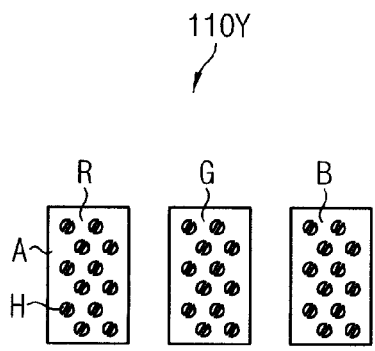
Figure 27:
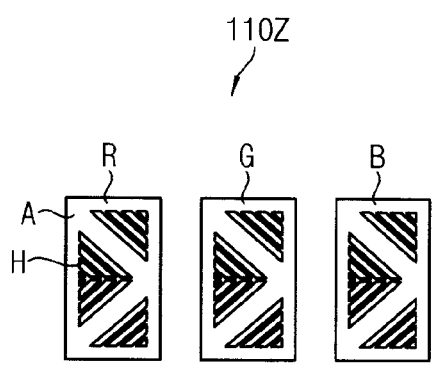
Figure 28:
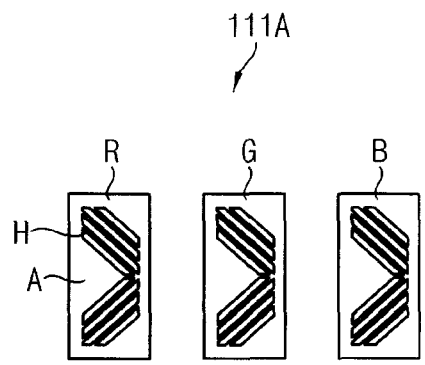
Figure 29:
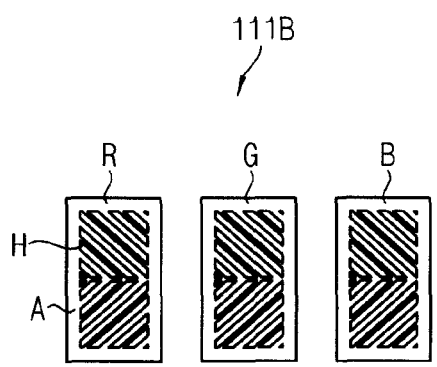
Figure 30:
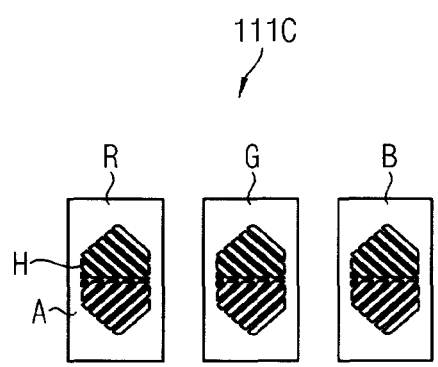
Figure 31:
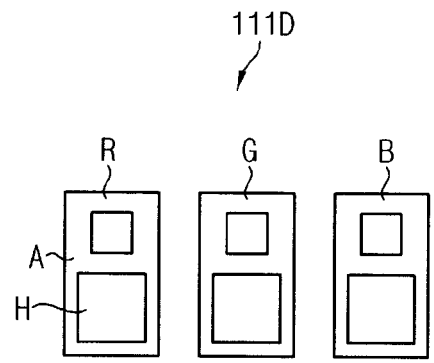
Figure 32:
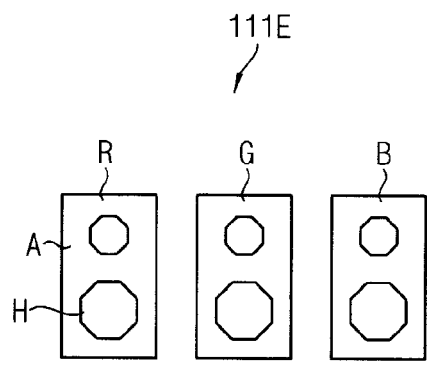
Figure 33:
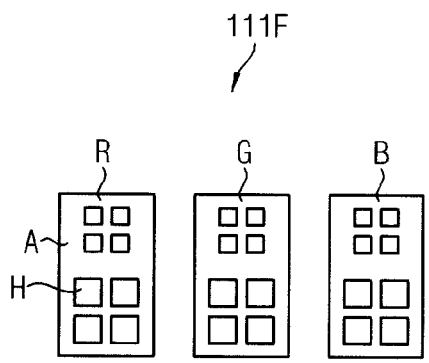
Figure 34:
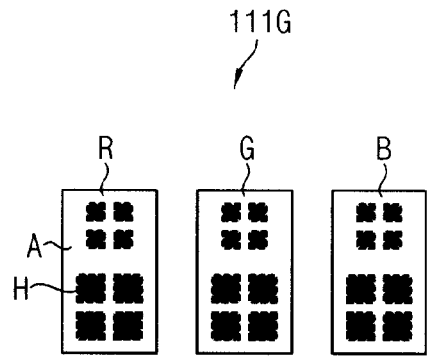
Figure 35:
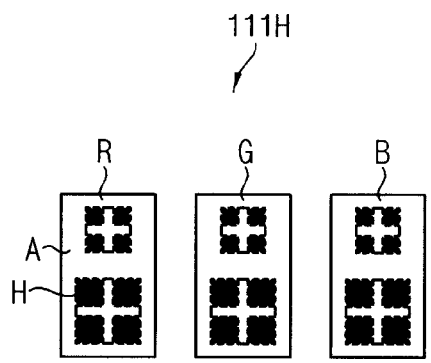
Figure 36:
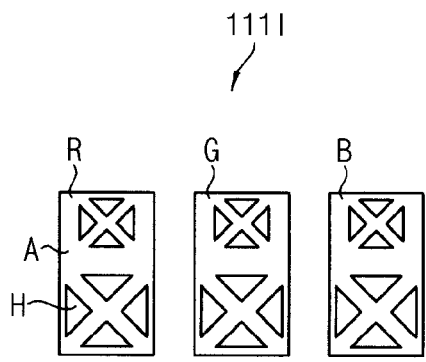
Figure 37:
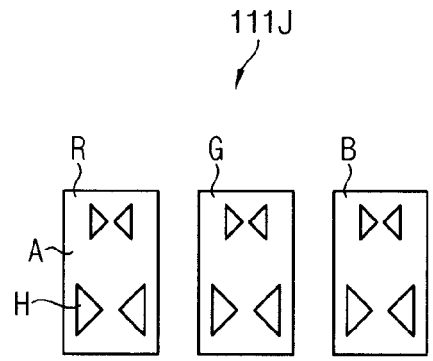
Figure 38:
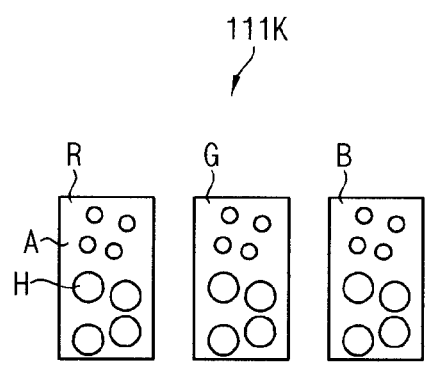
Figure 39:
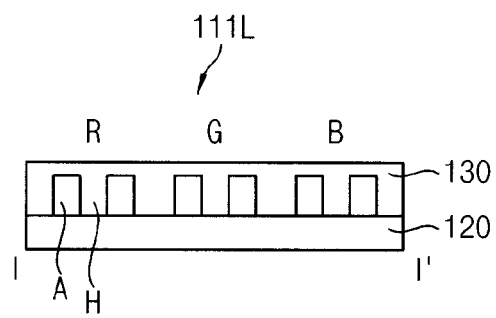
Figure 40:
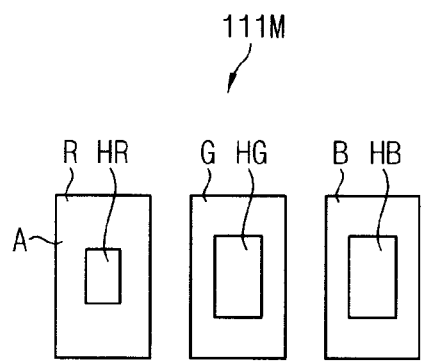
Figure 41:
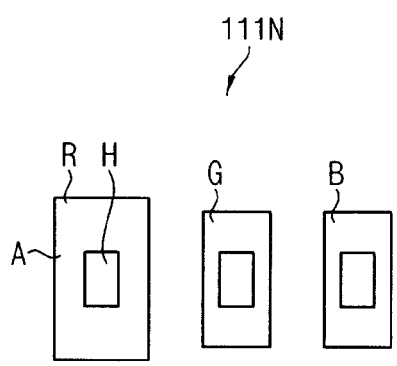
Figure 42A:
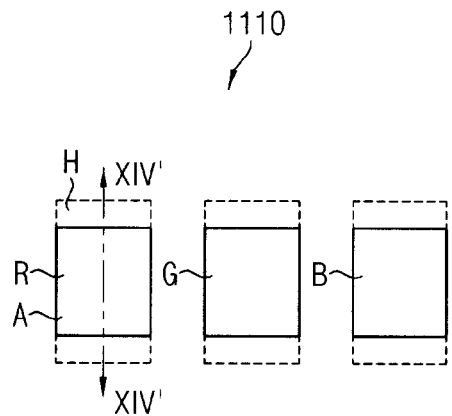
Figure 42B:
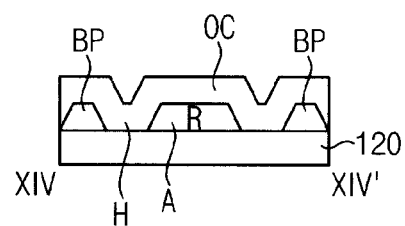
Figure 43:
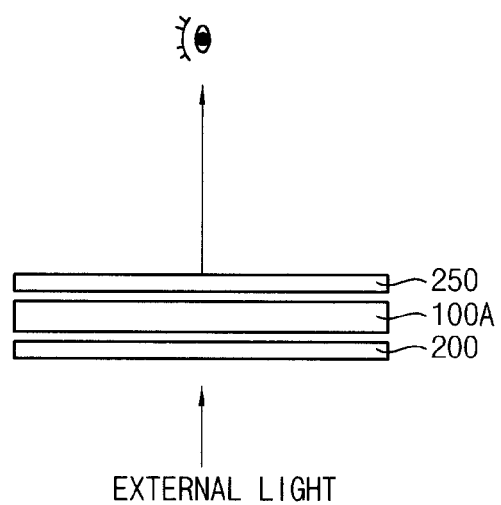
Figure 44:
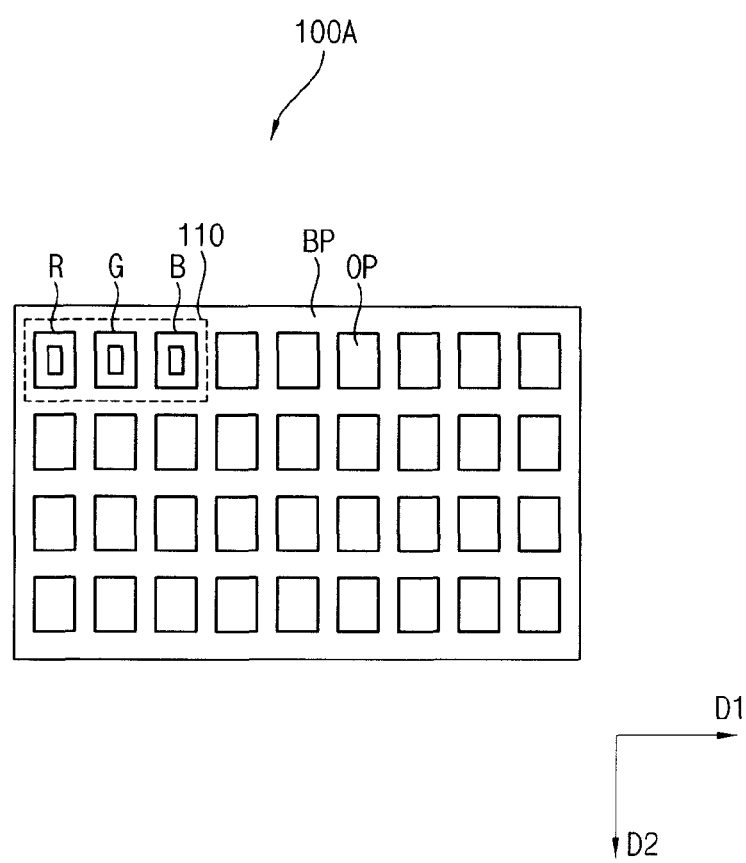

9B is a cross-sectional view illustrating the color filter unit cut along a line VII-VII' shown in FIG. 9A;

FIG. 10A is a plan view illustrating a color filter unit according to an example embodiment of the present invention; FIG. 10B is a cross-sectional view illustrating the color filter unit cut along a line VIII-VIII' shown in FIG. 10A;

FIG. 11A is a plan view illustrating a color filter unit according to an example embodiment of the present invention; FIG. 11B is a cross-sectional view illustrating the color filter unit cut along a line IX-IX' shown in FIG. 11A;

FIG. 12A is a plan view illustrating a color filter unit according to an example embodiment of the present invention; FIG. 12B is a cross-sectional view illustrating the color filter unit cut along a line X-X' shown in FIG. 12A;

FIG. 13A is a plan view illustrating a color filter unit according to an example embodiment of the present invention; FIG. 13B is a cross-sectional view illustrating the color filter unit cut along a line XI-XI' shown in FIG. 13A;

FIG. 14A is a plan view illustrating a color filter unit according to an example embodiment of the present invention; FIG. 14B is a cross-sectional view illustrating the color filter unit cut along a line XII-XII' shown in FIG. 14A;

FIG. 15A is a plan view illustrating a color filter unit according to an example embodiment of the present invention; FIG. 15B is a cross-sectional view illustrating the color filter unit cut along a line XIII-XIII' shown in FIG. 15A;

FIG. 16 is a plan view illustrating a color filter unit according to an example embodiment of the present invention;

FIG. 17 is a plan view illustrating a color filter unit according to an example embodiment of the present invention;

FIG. 18 is a plan view illustrating a color filter unit according to an example embodiment of the present invention;

FIG. 19A is a plan view illustrating a color filter unit according to an example embodiment of the present invention; FIG. 19B is a plan view illustrating a color filter unit according to an example embodiment of the present invention;

FIG. 20A is a plan view illustrating a color filter unit according to an example embodiment of the present invention; FIG. 20B is a plan view illustrating a color filter unit according to an example embodiment of the present invention;

FIG. 21 is a plan view illustrating a color filter unit according to an example embodiment of the present invention;

FIG. 22 is a plan view illustrating a color filter unit according to an example embodiment of the present invention;

FIG. 23 is a plan view illustrating a color filter unit according to an example embodiment of the present invention;

FIG. 24 is a plan view illustrating a color filter unit according to an example embodiment of the present invention;

FIG. 25 is a plan view illustrating a color filter unit according to an example embodiment of the present invention;

FIG. 26 is a plan view illustrating a color filter unit according to an example embodiment of the present invention;

FIG. 27 is a plan view illustrating a color filter unit according to an example embodiment of the present invention;

FIG. 28 is a plan view illustrating a color filter unit according to an example embodiment of the present invention;

FIG. 29 is a plan view illustrating a color filter unit according to an example embodiment of the present invention;

FIG. 30 is a plan view illustrating a color filter unit according to an example embodiment of the present invention;

FIG. 31 is a plan view illustrating a color filter unit according to an example embodiment of the present invention;

FIG. 32 is a plan view illustrating a color filter unit according to an example embodiment of the present invention;

FIG. 33 is a plan view illustrating a color filter unit according to an example embodiment of the present invention;

FIG. 34 is a plan view illustrating a color filter unit according to an example embodiment of the present invention;

FIG. 35 is a plan view illustrating a color filter unit according to an example embodiment of the present invention;

FIG. 36 is a plan view illustrating a color filter unit according to an example embodiment of the present invention;

FIG. 37 is a plan view illustrating a color filter unit according to an example embodiment of the present invention;

FIG. 38 is a plan view illustrating a color filter unit according to an example embodiment of the present invention;

FIG. 39 is a cross-sectional view illustrating a color filter unit according to an example embodiment of the present invention;

FIG. 40 is a plan view illustrating a color filter unit according to an example embodiment of the present invention;

FIG. 41 is a plan view illustrating a color filter unit according to an example embodiment of the present invention;

FIG. 42A is a plan view illustrating a color filter unit according to an example embodiment of the present invention; FIG. 42B is a cross-sectional view illustrating a red filter, a light blocking pattern and a overcoating layer cut along a line XIV-XIV' shown in FIG. 42A;

FIG. 43 is a cross sectional view illustrating a transparent display apparatus according to an example embodiment of the present invention; and FIG. 44 is a plan view illustrating a display panel of the transparent display apparatus illustrated in FIG. 43.

DETAILED DESCRIPTION OF THE INVENTION

Hereinafter, the present invention will be explained in detail with reference to the accompanying drawings.

Figure 1:
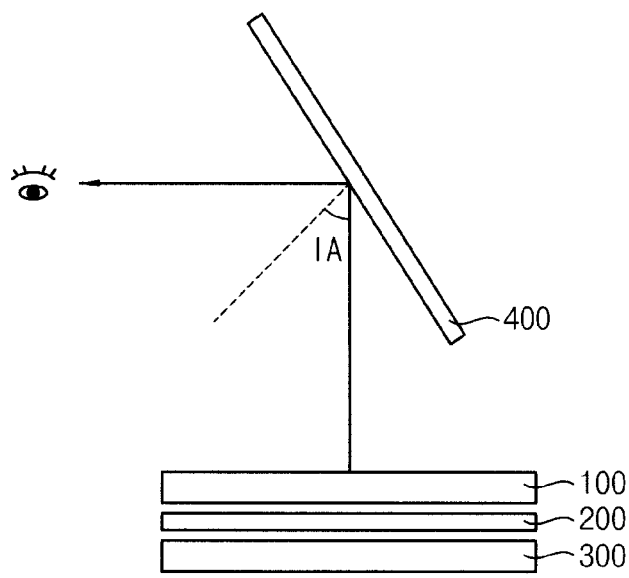
FIG. 1 is a cross-sectional view illustrating a transparent display apparatus according to an example embodiment of the present invention.

FIG. 1 is a cross-sectional view illustrating a transparent (or transflective) display apparatus according to an example embodiment of the present invention.

Referring to FIG. 1, the transparent display apparatus includes a display panel 100, a polarizer 200, a light source 300, and a transparent reflective element 400.

The display panel 100 may include a first substrate (not shown), a second substrate (not shown) and a liquid crystal layer (not shown) disposed between the first and second substrates.

The first substrate may be a thin film transistor ("TFT") substrate. The first substrate may include a pixel layer (not shown) on which a plurality of TFTs disposed in a matrix form and a pixel electrode (not shown).

The first substrate may include a first base substrate, the TFTs disposed on the first base substrate, a protecting layer disposed on the TFTs, and the pixel electrode disposed on the protecting layer and connected to the TFTs.

The second substrate may be a color filter substrate. The second substrate may include a color filter (not shown) presenting a color by filtering a light passing the color filter and a common electrode (not shown) facing the pixel electrode.

The second substrate may include a second base substrate, the color filter disposed on the second base substrate, a light blocking pattern disposed between the color filters, a overcoating layer disposed on the color filter, the common electrode disposed on the overcoating layer, and a column spacer disposed on the common electrode and maintaining a gap between the first substrate and the second substrate.

In one or more embodiments, the color filter may be disposed on the first substrate instead of the second substrate. If the color filter is disposed on the first substrate, a planarizing layer compensating a difference of heights of the color filters may be further formed on the color filter. In addition, if the light blocking pattern is disposed on the first substrate as well as the color filter, the overcoating layer of the second substrate may be omitted.

The pixel electrode and the common electrode respectively include a transparent material to transmit an external light. For example, the pixel electrode and the common electrode may include at least one of Indium Tin Oxide ("ITO") and Indium Zinc Oxide ("IZO").

The liquid crystal layer disposed between the first substrate and the second substrate is sealed by a sealant. The liquid crystal layer includes a plurality of liquid crystal molecules disposed in a specific arrangement. The liquid crystal molecules have optical and electrical characteristics such as anisotropy of refractivity and anisotropy of permittivity. An arrangement of the liquid crystal molecules in the liquid crystal layer is changed by an electric field generated between the pixel electrode and the common electrode. According to the change of the arrangement of the liquid crystal molecules, the liquid crystal layer adjusts transmittance of light passing through the liquid crystal layer.

The polarizer 200 is disposed between the light source 300 and the display panel 100. The polarizer 200 may be disposed adjacent to the first substrate of the display panel 100.

The polarizer 200 transmits a light having a direction same as a polarizing axis of the polarizer 200 and absorbs a light having a direction different from the polarizing axis of the polarizer 200. Accordingly, the polarizer 200 polarizes a light emitted from the light source 300 disposed under the polarizer 200. The polarizer 200 may adhere to the first substrate of the display panel 100 using an adhesive (not shown) or an adhesive tape (not shown).

The light emitted from the light source 300 passes through the polarizer 200 and is provided to the display panel 100. When the image on the display panel 100 does not have any colors, the display panel 100 presents white according to a luminance of the light from the light source 300 and a grayscale of the image.

The transparent reflective element 400 is spaced apart from the display panel 100. The transparent reflective element 400 reflects the image provided from the display panel 100. The transparent reflective element 400 polarizes the light provided from the display panel 100 to generate a reflecting light. The transparent reflective element 400 functions as a polarizer disposed over the display panel 100.

The transparent reflective element 400 is disposed in a range capable of receiving the light from the display panel 100. In addition, the transparent reflective element 400 is inclined such that the incident light to the transparent reflective element 400 from the display panel 100 has an incident angle IA greater than 0° and smaller than 90°. For example, the incident angle IA of the incident light may be greater than 10° and smaller than 80°. When the incident light has the incident angle IA of Brewster's angle, which is $IA=\tan^{-1} n$, the image may be displayed most clearly and sharply. Herein, n is a refractive index of the transparent reflective element 400.

The inclined angle of the transparent reflective element 400 may be adjusted according to the incident angle IA of the incident light and a viewpoint of an observer.

The transparent reflective element 400 includes a transparent material having a refractive index n equal to or greater than 1. For example, the transparent reflective element 400 may include at least one of a glass, an acrylic, and a polycarbonate ("PC"). Thus, the observer may observe the image displayed on the transparent reflective element 400 and overlapping a real object such as at least one of a background, a human, and a thing disposed at a back side of the transparent reflective element 400.

The transparency of the transparent reflective element 400 may be adjusted according to a luminance of the light source 300 and a grayscale of the image. The transparent display apparatus may further include a control part (not shown) sensing an intensity of an external light and adjusting the luminance of the light source 300 and the grayscale of the image to control the transparency of the transparent reflective element 400 according to the sensed intensity of the external light. According to the transparency of the transparent reflective element 400, the real object disposed at the back side of the transparent reflective element 400 may be seen clearly or may not be seen.

The transparent reflective element 400 may have a curved surface. If the transparent reflective element has the curved surface, the image may be magnified or reduced by the transparent reflective element 400.

The transparent reflective element 400 may display an inverted image in a horizontal direction or a vertical direction. The control part may compensate a distortion of the image based on the inversion of the image. The control part may provide an inverted image of the image on at least one of the transparent reflective element 400 and the display panel 100. The control part may compensate a distortion of the image based on the magnification and the reduction of the image.

When the display panel 100 does not display a color image but white light, the display panel 100, the polarizer 200, and the light source 300 in combination may be used as a lighting apparatus. The transparent reflective element 400 is spaced apart from the display panel 100, so that the transparent display apparatus may accommodate various spatial arrangements. In addition, the transparent reflective element 400 may not have a bezel; advantageously, design flexibility of the transparent display apparatus may be improved.

Although not shown in figures, the transparent display apparatus may further include a first optical sheet disposed on the display panel 100 to condense the light transmitted to the transparent reflective element 400. For example, the first optical sheet may include a condensing sheet or a prism sheet.

Although not shown in figures, the transparent display apparatus may further include a second optical sheet disposed between the polarizer 200 and the display panel 100. For example, the second optical sheet may include a condensing sheet, a phase difference compensating film, or a diffusing sheet.

Although not shown in figures, the transparent display apparatus may further include a reflecting film disposed on a surface opposite to a display surface of the transparent reflective element 400. The reflecting film reflects the light so that the light does not pass through the transparent reflective element 400. Accordingly, the image is not displayed on the surface opposite to the display surface of the transparent reflective element 400; advantageously, security of the transparent display apparatus may be improved.

Although not shown in figures, the transparent display apparatus may further include a reflecting plate spaced apart from the display panel 100 and disposed between the display panel and the transparent reflective element 400. The reflecting plate reflects the light provided from the display panel 100 to the transparent reflective element 400. The transparent display apparatus may further include the reflecting plate so that the design flexibility of the transparent display apparatus may be improved.

Figure 2:
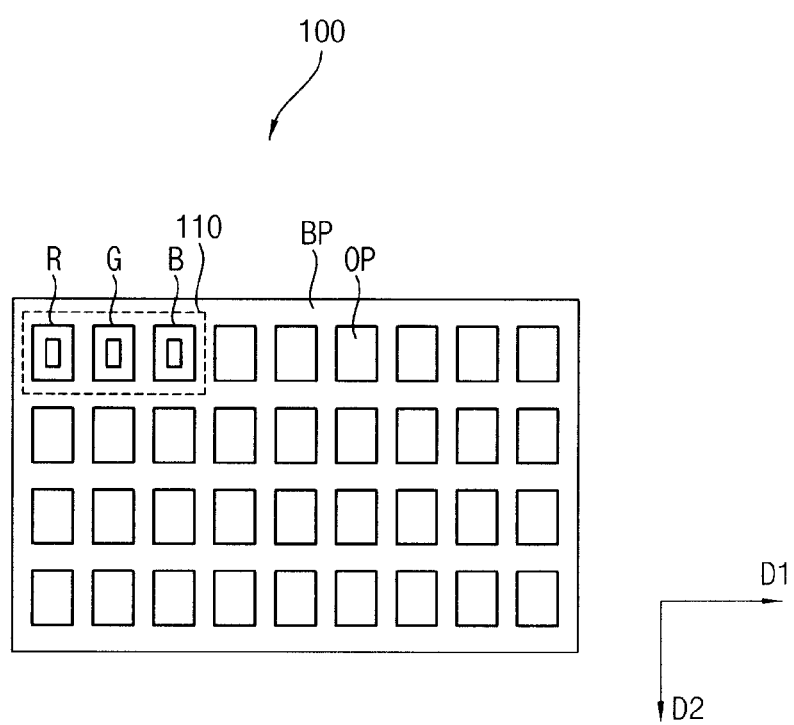
FIG. 2 is a plan view illustrating a display panel of the transparent display apparatus illustrated in FIG. 1.

FIG. 2 is a plan view illustrating a display panel of the transparent display apparatus illustrated in FIG. 1.

Referring to FIG. 2, the display panel 100 includes a plurality of opening portions OP and a blocking portion BP disposed between the opening portions OP to define the opening portions OP. The opening portions OP may be called pixel areas. The pixel areas OP are separated from each other by the blocking portion BP. The pixel areas OP may be disposed in a matrix form.

Color filters may be disposed at the pixel areas OP. A light blocking patterns may be disposed at the blocking portion BP. In one or more embodiments, a portion of the color filters may overlap the blocking portion BP.

A single pixel area OP is surrounded by (at least a portion of) the blocking portion BP. The pixel area OP may have various shapes. For example, the pixel area OP may have a substantially rectangular shape having at least a chamfered corner.

For convenience of explanation, the pixel area OP has a rectangular shape. A shorter side of the pixel area OP is substantially parallel to a first direction D1. A longer side of the pixel area OP is substantially parallel to a second direction D2 which is perpendicular to the first direction D1. The pixel area OP has a rectangular shape having a vertical longitudinal direction. Alternatively, a shorter side of the pixel area OP may be substantially parallel to the second direction D2. A longer side of the pixel area OP may be substantially parallel to the first direction D1. The pixel area OP has a rectangular shape having a horizontal longitudinal direction.

The light blocking pattern blocks lights from passing portions between adjacent pixel areas OP so that lights passing the pixel areas OP are not interfered from each other.

The color filters include red filters R, green filters G, and blue filters B. The display panel 100 includes a plurality of color filter units 110 which may be repeated in the display panel 100. A single color filter unit 110 may include a single red filter R, a single green filter G, and a single blue filter B. The color filter unit 110 is explained in detail referring to FIGS. 3A and 3B.

Figure 3A:
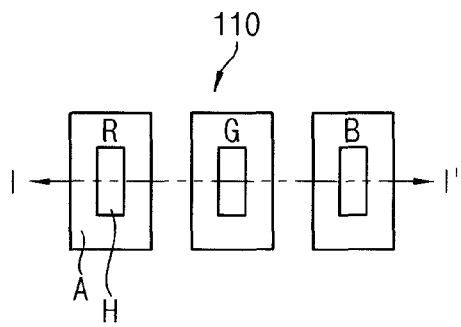
FIG. 3A is a plan view illustrating a color filter unit of the display panel illustrated in FIG. 2.
Figure 3B:
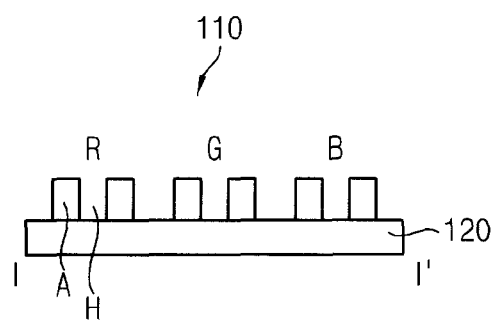
FIG. 3B is a cross-sectional view illustrating the color filter unit cut along a line I-I' shown in FIG. 3A.

FIG. 3A is a plan view illustrating the color filter unit 110 of the display panel 100 illustrated in FIG. 2. FIG. 3B is a cross-sectional view illustrating the color filter unit 110 cut along a line I-I' shown in FIG. 3A.

Referring to FIGS. 1, 2, 3A and 3B, the red filter R includes a first portion A (or first structure) and a second portion H (or second structure). The first portion A is a portion where the color filter has a first thickness. The second portion H may include a through hole or may be a through hole. In one or more embodiments, the second portion H is a through hole extending through the first thickness and surrounded by the first portion A. The second portion H is disposed in the pixel area OP of the display panel 100. The second portion H may be disposed in a central portion of the pixel area OP.

The first portion A and the second portion H may be formed using a mask having a shape corresponding to at least one the first portion A and the second portion H.

The first portion A of the red filter R is formed on a base substrate 120 and has the first thickness. The first portion A of the red filter R converts a light filtered by the first portion A of the red filter R into red. The first portion A of the red filter R has a first light transmittance.

The second portion H of the red filter R is a hole. The second portion H of the red filter R allows a light to pass without substantial conversion. The second portion H of the red filter R has a second light transmittance higher than the first light transmittance.

The light transmittance of the red filter R may be adjusted by adjusting a size of the second portion H. As the size of the second portion H increases, the light transmittance of the red filter R increases and the color reproducibility of the red filter R decreases. If an intensity of the light from the light source 300 is fixed, the luminance of the light passing through the red filter R increases as the size of the second portion H increases.

For example, to adjust the size of the second portion H, a width of the second portion H in the first direction D1 may be increased or decreased. Additionally or alternatively, to adjust the size of the second portion H, a width of the second portion H in the second direction D2 may be increased or decreased.

Although a shape of the second portion H has a rectangular shape having a longer side substantially parallel to the second direction D2 in the present example embodiment, the present invention is not limited thereto. The second portion H may have one or more of other shapes.

Like the red filter R, each of the green filter G and the blue filter B includes a first portion A and a second portion H. The first portion A is a portion where the color filter has a first thickness. The second portion includes or is a hole H surrounded by the first portion A.

Sizes of the second portions H of the red filter R, the green filter G, and the blue filter B may be adjusted (or configured) to be same as one another. In one or more embodiments, the sizes of the second portions H of the red filter R, the green filter G, and the blue filter B may be adjusted (or configured) to be different from one another.

Figure 3C:
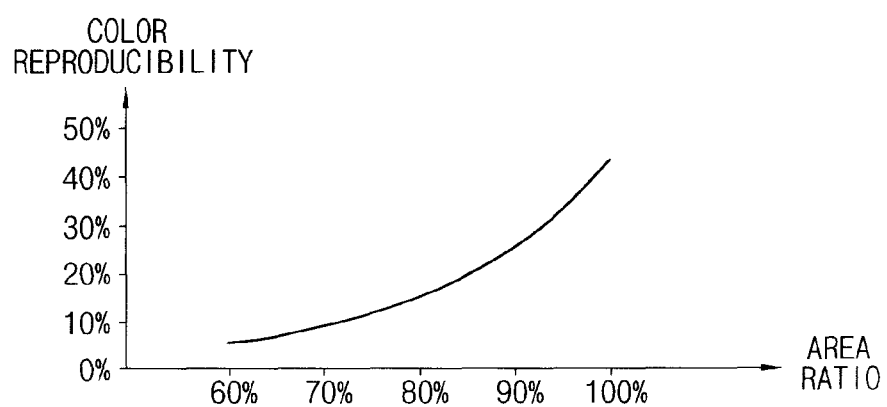
FIG. 3C is a graph illustrating a color reproducibility of the display panel according to an area ratio of a first portion to a pixel area of the color filter unit illustrated in FIG. 2.
Figure 3D:
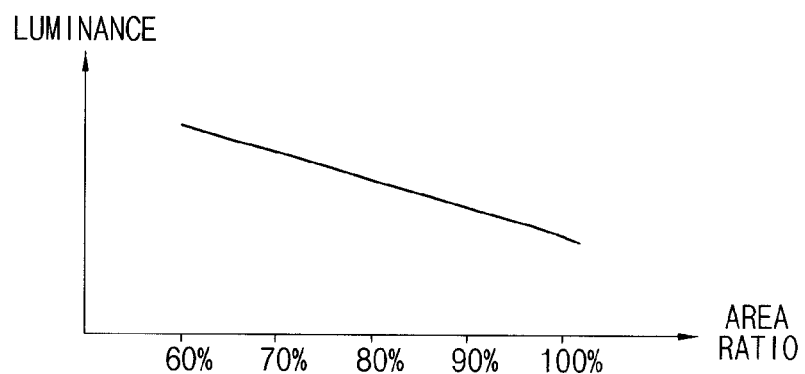
FIG. 3D is a graph illustrating a luminance of the display panel according to the area ratio of the first portion to the pixel area of the color filter unit illustrated in FIG. 2.

FIG. 3C is a graph illustrating a color reproducibility of the display panel 100 according to an area ratio of the first portion A to a pixel area OP of the color filter unit 110 illustrated in FIG. 2. FIG. 3D is a graph illustrating a luminance of the display panel 100 according to the area ratio of the first portion A to the pixel area OP of the color filter unit 110 illustrated in FIG. 2.

Referring to FIG. 3C, as the area ratio of the first portion A to the pixel area OP increases, the color reproducibility of the display panel 100 increases. For example, as the area ratio of the first portion A to the pixel area OP increases, the color reproducibility of the display panel 100 may exponentially increase.

For example, when the area ratio of the first portion A to the pixel area OP is about 60%, the color reproducibility of the display panel 100 may be about 5%. When the area ratio of the first portion A to the pixel area OP is about 80%, the color reproducibility of the display panel 100 may be about 15%. When the area ratio of the first portion A to the pixel area OP is about 100%, the color reproducibility of the display panel 100 may be about 45%.

Referring to FIG. 3D, as the area ratio of the first portion A to the pixel area OP increases, the luminance of the display panel 100 decreases. For example, as the area ratio of the first portion A to the pixel area OP increases, the luminance of the display panel 100 may linearly decrease.

According to the present example embodiment, the sizes of the second portions H of the red filter R, the green filter G, and the blue filter B are adjusted so that the display panel 100 may have a light transmittance and a color reproducibility suitable for one or more particular applications of a transparent display technique that combines images of virtual objects and real objects.

Figure 4A:
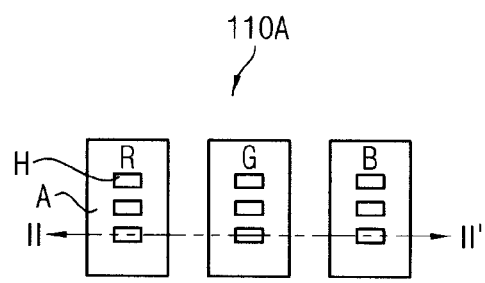
FIG. 4A is a plan view illustrating a color filter unit according to an example embodiment of the present invention.
Figure 4B:
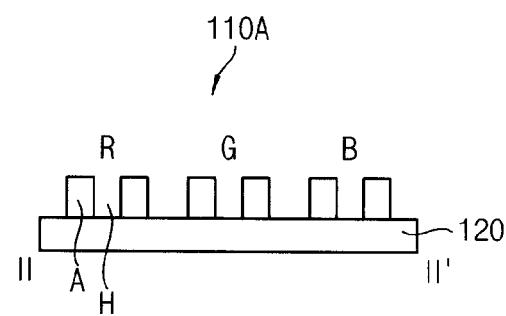
FIG. 4B is a cross-sectional view illustrating the color filter unit cut along a line II-IF shown in FIG. 4A.

FIG. 4A is a plan view illustrating a color filter unit 110A according to an example embodiment of the present invention. FIG. 4B is a cross-sectional view illustrating the color filter unit 110A cut along a line II-II' shown in FIG. 4A.

A transparent display apparatus according to the present example embodiment is substantially the same as the transparent display apparatus of the previous example embodiment explained referring to FIGS. 1 to 3D except that a plurality of second portions H are formed at the respective color filters R, G, and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, 4A, and 4B, a red filter R includes a first portion A and a plurality of second portions H. The first portion A is a portion where the color filter has a first thickness. The second portions H may include through holes or may be through holes. The second portions H are surrounded by the first portion A. The second portions H are disposed in the pixel area OP of the display panel 100. One or more of the second portions H may be disposed in a central portion of the pixel area OP in the first direction D1. The second portions H may be disposed along the second direction D2.

In one or more embodiments, if a size of the second portions H is smaller than a resolution of an exposure apparatus, in place of through holes, the second portions H may include recess portions and may include color filter portions thinner than the first portion A and formed, for example, using a halftone mask.

The light transmittance of the red filter R may be adjusted by adjusting the number of the second portions H. Alternatively, the light transmittance of the red filter R may be adjusted by adjusting sizes of the second portions H.

Although a shape of the second portion H has a rectangular shape having a longer side substantially parallel to the first direction D1 in the present example embodiment, the present invention is not limited thereto. The second portion H may have one or more of other shapes.

Like the red filter R, each of the green filter G and the blue filter B includes a first portion A and a plurality of second portions H. The first portion A is a portion where the color filter has a first thickness. The second portions H may include through holes or may be through holes. The second portions H are surrounded by the first portion A.

The numbers of the second portions H of the red filter R, the green filter G, and the blue filter B may be adjusted to be same as one another. In one or more embodiments, the numbers of the second portions H of the red filter R, the green filter G, and the blue filter B may be adjusted to be different from one another.

Sizes of the second portions H of the red filter R, the green filter G and the blue filter B may be adjusted to be same as one another. Alternatively, the sizes of the second portions H of the red filter R, the green filter G and the blue filter B may be adjusted to be different from one another.

According to the present example embodiment, the numbers of the second portions H of the red filter R, the green filter G, and the blue filter B are adjusted so that the display panel 100 may have a light transmittance and a color reproducibility suitable one or more applications of a transparent display technique.

The sizes of the second portions H of the color filters R, G, and B according to the present example embodiment may be smaller than the sizes of the second portions H of the color filters R, G, and B illustrated in the examples of FIGS. 3A and 3B, so that the second portions H may not appear to the observer as a stain. Thus, display quality may be improved.

Figure 5A:
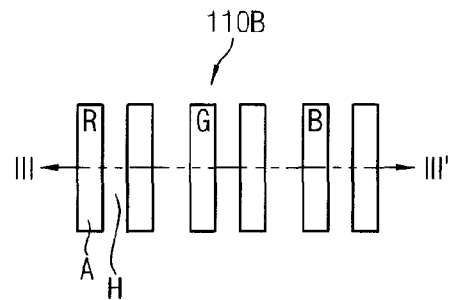
FIG. 5A is a plan view illustrating a color filter unit according to an example embodiment of the present invention.
Figure 5B:
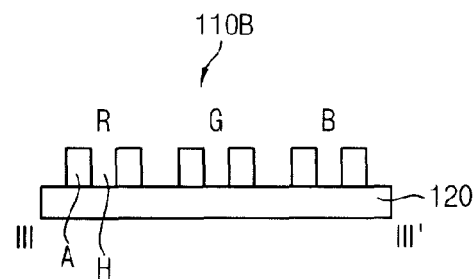
FIG. 5B is a cross-sectional view illustrating the color filter unit cut along a line III-III' shown in FIG. 5A.

FIG. 5A is a plan view illustrating a color filter unit 110B according to an example embodiment of the present invention. FIG. 5B is a cross-sectional view illustrating the color filter unit 110B cut along a line III-III' shown in FIG. 5A.

A transparent display apparatus according to the present example embodiment is substantially the same as the transparent display apparatus of the previous example embodiment explained referring to FIGS. 1 to 3D except that the second portions H of the respective color filters R, G, and B cross shorter sides of the respective color filters R, G, and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, 5A, and 5B, a red filter R includes a first portion A and a second portion H. The first portion A is a portion where the color filter has a first thickness. The second portion H may include a through hole or may be a through hole. The second portion H extends from a first shorter side of the red filter R to a second shorter side of the red filter R facing the first shorter side. The second portion H is disposed in the pixel area OP of the display panel 100. The second portion H may be disposed in a central portion of the pixel area OP in the first direction D1.

The light transmittance of the red filter R may be adjusted by adjusting a size of the second portion H. For example, to adjust the size of the second portion H, a width of the second portion H in the first direction D1 may be increased or decreased.

Although a shape of the second portion H has a rectangular shape having a longer side substantially parallel to the second direction D2 in the present example embodiment, the present invention is not limited thereto. The second portion H may have one or more of other shapes.

Like the red filter R, each of the green filter G and the blue filter B includes a first portion A and a second portion H. The first portion A is a portion where the color filter has a first thickness. The second portion H may include a hole or may be a hole. The second portions H respectively extend from first shorter sides of the green and blue filters G and B to second shorter sides of the green and blue filters G and B facing the first shorter sides.

Sizes of the second portions H of the red filter R, the green filter, G and the blue filter B may be adjusted to be same as one another. In one or more embodiments, the sizes of the second portions H of the red filter R, the green filter G, and the blue filter B may be adjusted to be different from one another.

According to the present example embodiment, the sizes of the second portions H of the red filter R, the green filter G, and the blue filter B are adjusted so that the display panel 100 may have a light transmittance and a color reproducibility suitable for one or more applications of a transparent display technique.

Figure 6A:
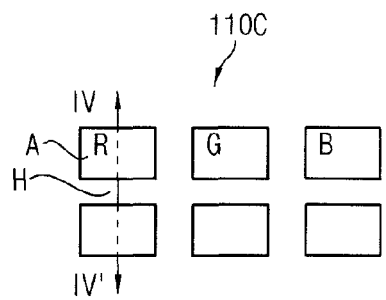
FIG. 6A is a plan view illustrating a color filter unit according to an example embodiment of the present invention.
Figure 6B:
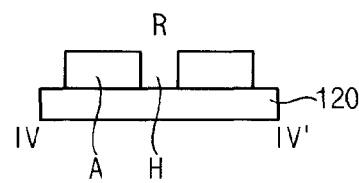
FIG. 6B is a cross-sectional view illustrating the color filter unit cut along a line IV-IV' shown in FIG. 6A.

FIG. 6A is a plan view illustrating a color filter unit 110C according to an example embodiment of the present invention. FIG. 6B is a cross-sectional view illustrating the color filter unit 110C cut along a line IV-IV' shown in FIG. 6A.

A transparent display apparatus according to the present example embodiment is substantially the same as the transparent display apparatus of the previous example embodiment explained referring to FIGS. 1 to 3D except that the second portions H of the respective color filters R, G and B cross longer sides of the respective color filters R, G and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, 6A, and 6B, a red filter R includes a first portion A and a second portion H. The first portion A is a portion where the color filter has a first thickness. The second portion H may include a hole or may be a hole. The second portion H extends from a first longer side of the red filter R to a second longer side of the red filter R facing the first longer side. The second portion H is disposed in the pixel area OP of the display panel 100. The second portion H may be disposed in a central portion of the pixel area OP in the second direction D2.

The light transmittance of the red filter R may be adjusted by adjusting a size of the second portion H. For example, to adjust the size of the second portion H, a width of the second portion H in the second direction D2 may be increased or decreased.

Although a shape of the second portion H has a rectangular shape having a longer side substantially parallel to the first direction D1 in the present example embodiment, the present invention is not limited thereto. The second portion H may have one or more of other shapes.

Like the red filter R, each of the green filter G and the blue filter B includes a first portion A and a second portion H. The first portion A is a portion where the color filter has a first thickness. The second portion H may include a hole or may be a hole. The second portions H respectively extend from first longer sides of the green and blue filters G and B to second longer sides of the green and blue filters G and B facing the first longer sides.

Sizes of the second portions H of the red filter R, the green filter G, and the blue filter B may be adjusted to be same as one another. In one or more embodiments, the sizes of the second portions H of the red filter R, the green filter G, and the blue filter B may be adjusted to be different from one another.

According to the present example embodiment, the sizes of the second portions H of the red filter R, the green filter G and the blue filter B are adjusted so that the display panel 100 may have a light transmittance and a color reproducibility suitable for one or more applications of a transparent display technique.

The second portions H of the color filters R, G, and B according to the present example embodiment cross the longer sides of the color filters R, G, and B so that overlay margins of the second portions H of the color filters R, G, and B may be extended comparing to the second portions H of the color filters R, G, and B of FIGS. 5A and 5B.

Figure 7A:
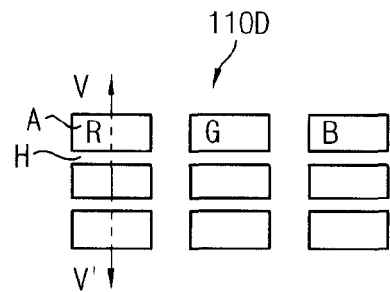
FIG. 7A is a plan view illustrating a color filter unit according to an example embodiment of the present invention.
Figure 7B:
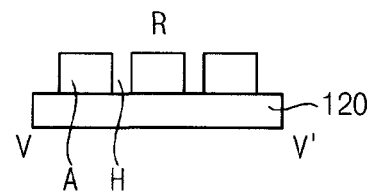
FIG. 7B is a cross-sectional view illustrating the color filter unit cut along a line V-V' shown in FIG. 7A.

FIG. 7A is a plan view illustrating a color filter unit 110D according to an example embodiment of the present invention. FIG. 7B is a cross-sectional view illustrating the color filter unit 110D cut along a line V-V' shown in FIG. 7A.

A transparent display apparatus according to the present example embodiment is substantially the same as the transparent display apparatus of the previous example embodiment explained referring to FIGS. 6A and 6B except that a plurality of the second portions H crossing the longer sides of the respective color filters R, G, and B are formed at the respective color filters R, G, and B. Thus, the same reference numerals will be used to refer to the same or like parts as those described in the previous example embodiment of FIGS. 6A and 6B and any repetitive explanation concerning the above elements may be omitted.

Referring to FIGS. 1, 2, 7A, and 7B, a red filter R includes a plurality of first portions A and a plurality of second portions H. The first portions A are portions where the color filters have a first thickness. The second portions H may include holes or may be holes. The second portions H extend from a first longer side of the red filter R to a second longer side of the red filter R facing the first longer side. The second portions H are disposed in the pixel area OP of the display panel 100. The second portions H may be disposed along the second direction D2. The first portions A defined by the second portions H may have a uniform width in the second direction.

The light transmittance of the red filter R may be adjusted by adjusting the number of the second portions H. Alternatively or additionally, the light transmittance of the red filter R may be adjusted by adjusting sizes of the second portions H.

Although a shape of the second portion H has a rectangular shape having a longer side substantially parallel to the first direction D1 in the present example embodiment, the present invention is not limited thereto. The second portion H may have one or more of other shapes.

Like the red filter R, each of the green filter G and the blue filter B includes a plurality of first portions A and a plurality of second portions H. The first portions A are portions where the color filters have a first thickness. The second portions H may include holes or may be holes. The second portions H respectively extend from first longer sides of the green and blue filters G and B to second longer sides of the green and blue filters G and B facing the first longer sides.

The numbers of the second portions H of the red filter R, the green filter G, and the blue filter B may be adjusted to be same as one another. In one or more embodiments, the numbers of the second portions H of the red filter R, the green filter G, and the blue filter B may be adjusted to be different from one another.

Sizes of the second portions H of the red filter R, the green filter G, and the blue filter B may be adjusted to be same as one another. In one or more embodiments, the sizes of the second portions H of the red filter R, the green filter G and the blue filter B may be adjusted to be different from one another.

According to the present example embodiment, the numbers of the second portions H of the red filter R, the green filter G, and the blue filter B are adjusted so that the display panel 100 may have a light transmittance and a color reproducibility suitable for one or more applications of a transparent display technique.

The sizes of the second portions H of the color filters R, G and B according to the present example embodiment may be smaller than the sizes of the second portions H of the color filters R, G and B illustrated in the example of FIGS. 6A and 6B, so that the second portions H may not appear to the observer as a stain. Thus, display quality may be improved.

Figure 8A:
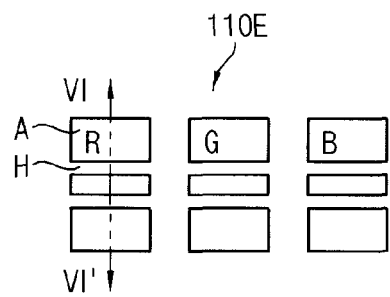
FIG. 8A is a plan view illustrating a color filter unit according to an example embodiment of the present invention.
Figure 8B:
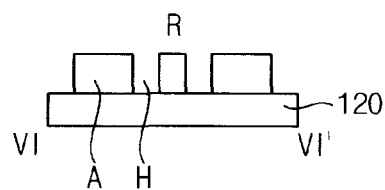
FIG. 8B is a cross-sectional view illustrating the color filter unit cut along a line VI-VI' illustrated in FIG. 8A.

FIG. 8A is a plan view illustrating a color filter unit 110E according to an example embodiment of the present invention. FIG. 8B is a cross-sectional view illustrating the color filter unit 110D cut along a line VI-VI' shown in FIG. 8A.

A transparent display apparatus according to the present example embodiment is substantially the same as the transparent display apparatus of the previous example embodiment explained referring to FIGS. 7A and 7B except that a plurality of the second portions H of the respective color filters R, G, and B crossing the longer sides of the respective color filters R, G, and B are concentrated in a central portion of the pixel area in the second direction. Thus, the same reference numerals will be used to refer to the same or like parts as those described in the previous example embodiment of FIGS. 7A and 7B and any repetitive explanation concerning the above elements may be omitted.

Referring to FIGS. 1, 2, 8A, and 8B, a red filter R includes a plurality of first portions A and a plurality of second portions H. The first portions A are portions where the color filters have a first thickness. The second portions H may include holes or may be holes. The second portions H extend from a first longer side of the red filter R to a second longer side of the red filter R facing the first longer side. The second portions H are disposed in the pixel area OP of the display panel 100. The second portions H may be disposed in a central portion of the pixel area in the second direction D2. Accordingly, the first portions A defined by the second portions H may have non-uniform widths in the second direction. The first portion A disposed in a central portion in the second direction D2 of the pixel area may have the minimum width (shorter than widths of other first portions) to be fabricated by an exposure apparatus.

The light transmittance of the red filter R may be adjusted by adjusting the number of the second portions H. Alternatively or additionally, the light transmittance of the red filter R may be adjusted by adjusting sizes of the second portions H.

Although a shape of the second portion H has a rectangular shape having a longer side substantially parallel to the first direction D1 in the present example embodiment, the present invention is not limited thereto. The second portion H may have one or more of other shapes.

Like the red filter R, each of the green filter G and the blue filter B includes a plurality of first portions A and a plurality of second portions H. The first portions A are portions where the color filters have a first thickness. The second portions H may include holes or may be holes. The second portions H respectively extend from first longer sides of the green and blue filters G and B to second longer sides of the green and blue filters G and B facing the first longer sides.

The numbers of the second portions H of the red filter R, the green filter G and the blue filter B may be adjusted to be same as one another. In one or more embodiments, the numbers of the second portions H of the red filter R, the green filter G and the blue filter B may be adjusted to be different from one another.

Sizes of the second portions H of the red filter R, the green filter G and the blue filter B may be adjusted to be same as one another. In one or more embodiments, the sizes of the second portions H of the red filter R, the green filter G and the blue filter B may be adjusted to be different from one another.

According to the present example embodiment, the numbers of the second portions H of the red filter R, the green filter G, and the blue filter B are adjusted so that the display panel 100 may have a light transmittance and a color reproducibility suitable for one or more applications of a transparent display technique.

In addition, the sizes of the second portions H of the color filters R, G, and B according to the present example embodiment may be smaller than the sizes of the second portions H of the color filters R, G and B of FIGS. 6A and 6B, so that the second portions H may not appear to the observer as a stain. Thus, display quality may be improved.

The second portions H of the color filters R, G, and B according to the present example embodiment are concentrated in the central portion of the pixel area in the second direction D2 so that overlay margins of the second portions H of the color filters R, G, and B may be extended comparing to the second portions H of the color filters R, G, and B of FIGS. 7A and 7B.

Figure 9B:
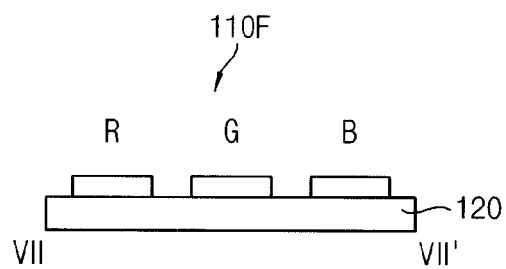

FIG. 9A is a plan view illustrating a color filter unit 110F according to an example embodiment of the present invention. FIG. 9B is a cross-sectional view illustrating the color filter unit 110F cut along a line VII-VII' shown in FIG. 9A.

A transparent display apparatus according to the present example embodiment is substantially the same as the transparent display apparatus of the previous example embodiment explained referring to FIGS. 1 to 3D except for the color filters R, G, and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, 9A, and 9B, the red filter R converts a light filtered by the red filter R into a red light. The red filter R is disposed on a base substrate 120 and has a second thickness. The second thickness is smaller than the first thickness of the first portion A of the red filter R illustrated in the example of FIGS. 3A and 3B.

The red filter R according to the present example embodiment has a material same as the red filter R of FIGS. 3A and 3B. The red filter R of the present example embodiment is formed using a halftone mask HT of which a light transmittance is adjusted. For example, the halftone mask may pass about 3% to about 45% of a light provided to the halftone mask.

If the first portion A of the red filter R of FIGS. 3A and 3B has a first light transmittance and the second portion H of the red filter R of FIGS. 3A and 3B has a second light transmittance, the red filter of the present example embodiment formed using the halftone mask has a third light transmittance greater than the first light transmittance and smaller than the second transmittance.

The light transmittance of the red color filter R may be adjusted by adjusting a thickness of the red color filter R.

Like the red filter R, each of the green filter G and the blue filter B has a second thickness smaller than the first thickness of the first portion A of the green and blue filters G and B of FIGS. 3A and 3B.

The second thicknesses of the red filter R, the green filter G, and the blue filter B may be adjusted to be same as one another. Alternatively, the second thicknesses of the red filter R, the green filter G, and the blue filter B may be adjusted to be different from one another.

According to the present example embodiment, the second thicknesses of the red filter R, the green filter G, and the blue filter B are adjusted so that the display panel 100 may have a light transmittance and a color reproducibility suitable for one or more applications of a transparent display technique.

FIG. 10A is a plan view illustrating a color filter unit 110G according to an example embodiment of the present invention. FIG. 10B is a cross-sectional view illustrating the color filter unit 110G cut along a line VIII-VIII' shown in FIG. 10A.

A transparent display apparatus according to the present example embodiment is substantially the same as the transparent display apparatus of the previous example embodiment explained referring to FIGS. 1 to 3D except that second portions of the color filters R, G and B are not through holes but recess portions or halftone portions. Thus, the same reference numerals will be used to refer to the same or like parts as those described in the previous example embodiment of FIGS. 1 to 3D and any repetitive explanation concerning the above elements may be omitted.

Referring to FIGS. 1, 2, 10A, and 10B, a red filter R includes a first portion A and a second portion HT. The first portion A is a portion where the color filter has a first thickness. The second portion HT may include a recess portion and a halftone portion where the color filter has a second thickness smaller than the first thickness.

The first portion A and the second portion HT may be formed using a normal mask having a shape corresponding to the first portion A and a halftone mask having a shape corresponding to the second portion HT.

The first portion A of the red filter R is formed on a base substrate 120 and has the first thickness. The first portion A of the red filter R converts a light filtered by the first portion A into a red light. The first portion A of the red filter R has a first light transmittance.

The second portion HT of the red filter R is formed on the base substrate 120 and has the second thickness. The second portion HT of the red filter R converts a light filtered by the second portion of the red filter R into a red light. The second portion of the red filter R has a third light transmittance greater than the first transmittance.

The light transmittance of the red filter R may be adjusted by adjusting a size of the second portion HT. In addition, the light transmittance of the red filter R may be adjusted by adjusting the second thickness of the second portion HT.

Like the red filter R, each of the green filter G and the blue filter B includes a first portion A and a second portion HT. The first portion A is a portion where the color filter has a first thickness. The second portion HT may include a recess portion and a halftone portion where the color filter has a second thickness smaller than the first thickness. The second portion HT is surrounded by the first portion.

Sizes of the second portions HT of the red filter R, the green filter G and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G and the blue filter B may be adjusted to be same as one another. Alternatively, the second thicknesses of the second portions HT of the red filter R, the green filter G and the blue filter B may be adjusted to be different from one another.

According to the present example embodiment, the sizes of the second portions HT of the red filter R, the green filter G, and the blue filter B are adjusted so that the display panel 100 may have a light transmittance and a color reproducibility suitable for one or more applications of a transparent display technique.

FIG. 11A is a plan view illustrating a color filter unit 110H according to an example embodiment of the present invention. FIG. 11B is a cross-sectional view illustrating the color filter unit 110H cut along a line IX-IX' shown in FIG. 11A.

A transparent display apparatus according to the present example embodiment is substantially the same as the transparent display apparatus of the previous example embodiment explained referring to FIGS. 4A and 4B except that second portions HT of the color filters R, G and B are not holes but halftone portions. Thus, the same reference numerals will be used to refer to the same or like parts as those described in the previous example embodiment of FIGS. 4A and 4B and any repetitive explanation concerning the above elements may be omitted.

Referring to FIGS. 1, 2, 11A, and 11B, a red filter R includes a first portion A and a plurality of second portions. The first portion A is a portion where the color filter has a first thickness. The second portions HT may include recess portions and halftone portions where the color filters have a second thickness smaller than the first thickness.

The first portion A and the second portions HT may be formed using a normal mask having a shape corresponding to the first portion A and a halftone mask having a shape corresponding to the second portions HT.

The light transmittance of the red filter R may be adjusted by adjusting the number of the second portions HT. Alternatively or additionally, the light transmittance of the red filter R may be adjusted by adjusting sizes of the second portions HT. Alternatively or additionally, the light transmittance of the red filter R may be adjusted by adjusting the second thicknesses of the second portions HT.

Like the red filter R, each of the green filter G and the blue filter B includes a first portion A and a plurality of second portions HT. The first portion A is a portion where the color filter has a first thickness. The second portions HT may include recess portions and halftone portions where the color filters have a second thickness smaller than the first thickness. The second portions HT are surrounded by the first portion.

The numbers of the second portions HT of the red filter R, the green filter G, and the blue filter B may be adjusted to be same as one another. Alternatively, the numbers of the second portions HT of the red filter R, the green filter G and the blue filter B may be adjusted to be different from one another.

Sizes of the second portions HT of the red filter R, the green filter G and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G, and the blue filter B may be adjusted to be same as one another. Alternatively, the second thicknesses of the second portions HT of the red filter R, the green filter G and the blue filter B may be adjusted to be different from one another.

According to the present example embodiment, the numbers of the second portions HT of the red filter R, the green filter G, and the blue filter B are adjusted so that the display panel 100 may have a light transmittance and a color reproducibility suitable for one or more applications of a transparent display technique.

The sizes of the second portions HT of the color filters R, G, and B according to the present example embodiment may be smaller than the sizes of the second portions HT of the color filters R, G and B illustrated in the examples of FIGS. 10A and 10B, so that the second portions HT may not appear to the observer as a stain. Thus, a display quality may be improved.

FIG. 12A is a plan view illustrating a color filter unit 110I according to an example embodiment of the present invention. FIG. 12B is a cross-sectional view illustrating the color filter unit 110I cut along a line X-X' shown in FIG. 12A.

A transparent display apparatus according to the present example embodiment is substantially the same as the transparent display apparatus of the previous example embodiment explained referring to FIGS. 5A and 5B except that second portions HT of the color filters R, G and B are not holes but halftone portions. Thus, the same reference numerals will be used to refer to the same or like parts as those described in the previous example embodiment of FIGS. 5A and 5B and any repetitive explanation concerning the above elements may be omitted.

Referring to FIGS. 1, 2, 12A, and 12B, a red filter R includes a first portion A and a second portion HT. The first portion A is a portion where the color filter has a first thickness. The second portion HT may include a recess portion and a halftone portion where the color filter has a second thickness smaller than the first thickness.

The first portion A and the second portion HT may be formed using a normal mask having a shape corresponding to the first portion A and a halftone mask having a shape corresponding to the second portion HT.

The light transmittance of the red filter R may be adjusted by adjusting a size of the second portion HT. Alternatively or additionally, the light transmittance of the red filter R may be adjusted by adjusting the second thickness of the second portion HT.

Like the red filter R, each of the green filter G and the blue filter B includes a first portion A and a second portion HT. The first portion A is a portion where the color filter has a first thickness. The second portion HT may include a recess portion and a halftone portion where the color filter has a second thickness smaller than the first thickness. The second portions HT respectively extend from first shorter sides of the green and blue filters G and B to second shorter sides of the green and blue filters G and B facing the first shorter sides.

Sizes of the second portions HT of the red filter R, the green filter G, and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G, and the blue filter B may be adjusted to be same as one another. Alternatively, the second thicknesses of the second portions HT of the red filter R, the green filter G and the blue filter B may be adjusted to be different from one another.

According to the present example embodiment, the sizes of the second portions HT of the red filter R, the green filter G, and the blue filter B are adjusted so that the display panel 100 may have a light transmittance and a color reproducibility suitable for one or more applications of a transparent display technique.

FIG. 13A is a plan view illustrating a color filter unit 110J according to an example embodiment of the present invention. FIG. 13B is a cross-sectional view illustrating the color filter unit 110J cut along a line XI-XI' shown in FIG. 13A.

A transparent display apparatus according to the present example embodiment is substantially the same as the transparent display apparatus of the previous example embodiment explained referring to FIGS. 6A and 6B except that second portions HT of the color filters R, G and B are not holes but halftone portions. Thus, the same reference numerals will be used to refer to the same or like parts as those described in the previous example embodiment of FIGS. 6A and 6B and any repetitive explanation concerning the above elements may be omitted.

Referring to FIGS. 1, 2, 13A, and 13B, a red filter R includes a first portion A and a second portion. The first portion A is a portion where the color filter has a first thickness. The second portion HT may include a recess portion and a halftone portion where the color filter has a second thickness smaller than the first thickness.

The light transmittance of the red filter R may be adjusted by adjusting a size of the second portion HT. Alternatively or additionally, the light transmittance of the red filter R may be adjusted by adjusting the second thickness of the second portion HT.

Like the red filter R, each of the green filter G and the blue filter B includes a first portion A and a second portion. The first portion A is a portion where the color filter has a first thickness. The second portion HT may include a recess portion and a halftone portion where the color filter has a second thickness smaller than the first thickness. The second portions HT respectively extend from first longer sides of the green and blue filters G and B to second longer sides of the green and blue filters G and B facing the first longer sides.

Sizes of the second portions HT of the red filter R, the green filter G, and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G, and the blue filter B may be adjusted to be same as one another. Alternatively, the second thicknesses of the second portions HT of the red filter R, the green filter G and the blue filter B may be adjusted to be different from one another.

According to the present example embodiment, the sizes of the second portions HT of the red filter R, the green filter G, and the blue filter B are adjusted so that the display panel 100 may have a light transmittance and a color reproducibility suitable for one or more applications of a transparent display technique.

The second portions HT of the color filters R, G and B according to the present example embodiment cross the longer sides of the color filters R, G, and B so that overlay margins of the second portions HT of the color filters R, G, and B may be extended comparing to the second portions H of the color filters R, G, and B illustrated in the examples of FIGS. 12A and 12B.

FIG. 14A is a plan view illustrating a color filter unit 110K according to an example embodiment of the present invention. FIG. 14B is a cross-sectional view illustrating the color filter unit 110K cut along a line XII-XII' shown in FIG. 14A.

A transparent display apparatus according to the present example embodiment is substantially the same as the transparent display apparatus of the previous example embodiment explained referring to FIGS. 7A and 7B except that second portions HT of the color filters R, G, and B are not holes but halftone portions. Thus, the same reference numerals will be used to refer to the same or like parts as those described in the previous example embodiment of FIGS. 7A and 7B and any repetitive explanation concerning the above elements may be omitted.

Referring to FIGS. 1, 2, 14A, and 14B, a red filter R includes a plurality of first portions A and a plurality of second portions HT. The first portions A are portions where the color filters have a first thickness. The second portions HT may include recess portions and halftone portions where the color filters have a second thickness smaller than the first thickness.

The light transmittance of the red filter R may be adjusted by adjusting the number of the second portions HT. Alternatively or additionally, the light transmittance of the red filter R may be adjusted by adjusting sizes of the second portions HT. Alternatively or additionally, the light transmittance of the red filter R may be adjusted by adjusting the second thicknesses of the second portions HT.

Like the red filter R, each of the green filter G and the blue filter B includes a plurality of first portions A and a plurality of second portions HT. The first portions A are portions where the color filters have a first thickness. The second portions HT may include recess portions and halftone portions where the color filters have a second thickness smaller than the first thickness. The second portions HT respectively extend from first longer sides of the green and blue filters G and B to second longer sides of the green and blue filters G and B facing the first longer sides.

The numbers of the second portions HT of the red filter R, the green filter G, and the blue filter B may be adjusted to be same as one another. Alternatively, the numbers of the second portions HT of the red filter R, the green filter G and the blue filter B may be adjusted to be different from one another.

Sizes of the second portions HT of the red filter R, the green filter G and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G, and the blue filter B may be adjusted to be same as one another. Alternatively, the second thicknesses of the second portions HT of the red filter R, the green filter G and the blue filter B may be adjusted to be different from one another.

According to the present example embodiment, the numbers of the second portions HT of the red filter R, the green filter G, and the blue filter B are adjusted so that the display panel 100 may have a light transmittance and a color reproducibility suitable for one or more applications of a transparent display technique.

The sizes of the second portions HT of the color filters R, G and B according to the present example embodiment may be smaller than the sizes of the second portions HT of the color filters R, G, and B illustrated in the examples of FIGS. 13A and 13B, so that the second portions HT may not appear to the observer as a stain. Thus, a display quality may be improved.

FIG. 15A is a plan view illustrating a color filter unit 110L according to an example embodiment of the present invention. FIG. 15B is a cross-sectional view illustrating the color filter unit 110L cut along a line XIII-XIII' shown in FIG. 15A.

A transparent display apparatus according to the present example embodiment is substantially the same as the transparent display apparatus of the previous example embodiment explained referring to FIGS. 8A and 8B except that second portions HT of the color filters R, G and B are not holes but halftone portions. Thus, the same reference numerals will be used to refer to the same or like parts as those described in the previous example embodiment of FIGS. 8A and 8B and any repetitive explanation concerning the above elements may be omitted.

Referring to FIGS. 1, 2, 15A, and 15B, a red filter R includes a plurality of first portions A and a plurality of second portions HT. The first portions A are portions where the color filters have a first thickness. The second portions HT H may include recess portions and halftone portions where the color filters have a second thickness smaller than the first thickness.

The light transmittance of the red filter R may be adjusted by adjusting the number of the second portions HT. Alternatively or additionally, the light transmittance of the red filter R may be adjusted by adjusting sizes of the second portions HT. Alternatively or additionally, the light transmittance of the red filter R may be adjusted by adjusting the second thicknesses of the second portions HT.

Like the red filter R, each of the green filter G and the blue filter B includes a plurality of first portions A and a plurality of second portions HT. The first portions A are portions where the color filters have a first thickness. The second portions HT H may include recess portions and halftone portions where the color filters have a second thickness smaller than the first thickness. The second portions HT respectively extend from first longer sides of the green and blue filters G and B to second longer sides of the green and blue filters G and B facing the first longer sides.

The numbers of the second portions HT of the red filter R, the green filter G, and the blue filter B may be adjusted to be same as one another. Alternatively, the numbers of the second portions HT of the red filter R, the green filter G and the blue filter B may be adjusted to be different from one another.

Sizes of the second portions HT of the red filter R, the green filter G and the blue filter B may be adjusted to be same as one another. Alternatively, the sizes of the second portions HT of the red filter R, the green filter G and the blue filter B may be adjusted to be different from one another.

The second thicknesses of the second portions HT of the red filter R, the green filter G and the blue filter B may be adjusted to be same as one another. Alternatively, the second thicknesses of the second portions HT of the red filter R, the green filter G and the blue filter B may be adjusted to be different from one another.

According to the present example embodiment, the numbers of the second portions HT of the red filter R, the green filter G and the blue filter B are adjusted so that the display panel 100 may have a light transmittance and a color reproducibility suitable for one or more applications of a transparent display technique.

The sizes of the second portions HT of the color filters R, G, and B according to the present example embodiment may be smaller than the sizes of the second portions HT of the color filters R, G, and B illustrated in the examples of FIGS. 13A and 13B, so that the second portions H may not appear to the observer as a stain. Thus, a display quality may be improved.

The second portions HT of the color filters R, G, and B according to the present example embodiment are concentrated in the central portion of the pixel area in the second direction D2 so that overlay margins of the second portions HT of the color filters R, G, and B may be extended comparing to the second portions H of the color filters R, G, and B illustrated in the examples of FIGS. 14A, and 14B.

FIG. 16 is a plan view illustrating a color filter unit 110M according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 16, the red filter R includes a first portion A and a second portion H. The first portion A is a portion where the color filter has a first thickness. The second portion H may include a through hole or may be a through hole extending through the first thickness. The second portion H is defined by the first portion. The second portion H is disposed in a pixel area OP of a display panel 100.

Alternatively, the second portion is a recess portion or halftone portion where the color filter has a second thickness smaller than the first thickness.

The second portion H has a cross shape. The second portion H includes a first extending portion extending in a first direction D1 and a second extending portion extending in a second direction D2 and crossing the first extending portion. For example, a central portion of the second extending portion may overlap or intersect a central portion of the first extending portion. The second portion H may include a plurality of cross shapes.

The light transmittance of the red filter R may be adjusted by adjusting widths of the first and second extending portions. Alternatively and additionally, the light transmittance of the red filter R may be adjusted by adjusting lengths of the first and second extending portions.

Like the red filter R, each of the green filter G and the blue filter B includes a first portion A and a second portion H. The first portion A is a portion where the color filter has a first thickness. The second portion H may include a through hole or may be a through hole.

Alternatively, the second portions of the green filter G and the blue filter B may include recess portions and halftone portions where the color filters have a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the widths and/or the lengths of the first and second extending portions of the second portions H are adjusted so that the display panel 100 may have a light transmittance and a color reproducibility suitable for one or more applications of a transparent display technique.

FIG. 17 is a plan view illustrating a color filter unit 110N according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 17, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions may include recess portions and halftone portions where the color filters have a second thickness smaller than the first thickness.

The second portions H may be disposed at both end portions of the pixel area OP in the second direction D2. A first group of the second portions H is disposed at a first end portion of the pixel area OP in the second direction D2. The second portions H in the first group are disposed along the first direction D1. A second group of the second portions H is disposed at a second end portion of the pixel area OP in the second direction D2. The second portions H in the second group are disposed along the first direction D1. A distance between the first group and the second group is larger than a distance between second portions H in a same group.

The light transmittance of the red filter R may be adjusted by adjusting the number of the second portions H. Alternatively or additionally, the light transmittance of the red filter R may be adjusted by adjusting sizes of the second portions H.

Although a shape of the second portion H has a square shape having sides substantially parallel to the first and second directions D1 and D2 in the present example embodiment, the present invention is not limited thereto. The second portion H may have one or more of other shapes.

Like the red filter R, each of the green filter G and the blue filter B includes a first portion A and a plurality of second portions. The first portion A is a portion where the color filter has a first thickness. The second portions may include through holes or may be through holes. The second portions H are defined by the first portion.

Alternatively, the second portions of the green filter G and the blue filter B may include recess portions and halftone portions where the color filters have a second thickness smaller than the first thickness.

Sizes of the second portions H of the red filter R, the green filter G, and the blue filter B may be adjusted to be same as one another. Alternatively, the sizes of the second portions H of the red filter R, the green filter G and the blue filter B may be adjusted to be different from one another.

According to the present example embodiment, the numbers of the second portions H of the red filter R, the green filter G and the blue filter B are adjusted so that the display panel 100 may have a light transmittance and a color reproducibility suitable for one or more applications of a transparent display technique.

FIG. 18 is a plan view illustrating a color filter unit 110O according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 18, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters have a second thickness smaller than the first thickness.

The second portions H may be disposed in a central portion of the pixel area OP. The second portions H may have an inclined angle with respect to a shorter side of the pixel area OP. The second portions H may be disposed in a rectangular area. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting a size of an area in which the second portions is disposed.

Like the red filter R, each of the green filter G and the blue filter B includes a first portion A and a plurality of second portions. The first portion A is a portion where the color filter has a first thickness. The second portions may include through holes or may be through holes.

Alternatively, the second portions of the green filter G and the blue filter B may include recess portions and halftone portions where the color filters have a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers or the widths of the slit patterns of the first portion A of the red filter R, the green filter G, and the blue filter B are adjusted so that the display panel 100 may have a light transmittance and a color reproducibility suitable for one or more applications of a transparent display technique.

FIG. 19A is a plan view illustrating a color filter unit 110P according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 19A, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters have a second thickness smaller than the first thickness.

The second portions H may be disposed at both end portions of the pixel area OP in the second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The second portions H may be disposed in a plurality of rectangular areas. For example, a first group of the second portions H may be disposed in a first rectangular area disposed at a first end portion of the pixel area OP in the second direction D2. A second group of the second portions H may be disposed in a second rectangular area disposed at a second end portion of the pixel area OP in the second direction D2. A distance between the first group and the second group may be substantially larger than a distance between second portions H in a same group.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first and second rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G and the blue filter B may be adjusted to be same as one another. Alternatively, the sizes of the second portions H of the red filter R, the green filter G and the blue filter B may be adjusted to be different from one another.

According to the present example embodiment, the numbers or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 19B is a plan view illustrating a color filter unit 110Q according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 19B, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed at both end portions of the pixel area OP in the second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The second portions H may be disposed in a plurality of rectangular areas. For example, a first group of the second portions H may be disposed in a first rectangular area disposed at a first end portion of the pixel area OP in the second direction D2. A second group of the second portions H may be disposed in a second rectangular area disposed at a second end portion of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP.

The first group of the second portions H and the second group of the second portions H may be symmetrical to each other with respect to an imaginary central line of the pixel area OP that has the two groups of second portions H disposed along the second direction D2.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first and second rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B H may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G and the blue filter B may be adjusted to be different from one another.

According to the present example embodiment, the numbers or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 20A is a plan view illustrating a color filter unit 110R according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 20A, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in corner portions of the pixel area OP. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and a trapezoidal shape having an inclined side with respect to the shorter side of the pixel area OP.

The second portions H may be disposed in a plurality of rectangular areas. For example, a first group of the second portions H may be disposed in a first rectangular area disposed in a first corner portion of the pixel area OP. A second group of the second portions H may be disposed in a second rectangular area disposed in a second corner portion of the pixel area OP opposite to the first corner portion in the first direction D1. A third group of the second portions H may be disposed in a third rectangular area disposed in a third corner portion of the pixel area OP opposite to the first corner portion in the second direction D2. A fourth group of the second portions H may be disposed in a fourth rectangular area disposed in a fourth corner portion of the pixel area OP opposite to the first corner portion in the first and second directions D1 and D2. A distance between two groups may be substantially larger than a distance between second portions H in a same group.

The first and second groups of the second portions H are defined by first slit patterns having a first inclined angle with respect to the shorter side of the pixel area OP. The third and fourth groups of the second portions H is defined by second slit patterns having a second inclined angle with respect to the shorter side of the pixel area OP.

The first group of the second portions H and the third group of the second portions H may be symmetrical to each other with respect to an imaginary central line of the pixel area OP in the second direction D2. The second group of the second portions H and the fourth group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first to fourth rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G and the blue filter B may be adjusted to be same as one another. Alternatively, the sizes of the second portions H of the red filter R, the green filter G and the blue filter B may be adjusted to be different from one another.

According to the present example embodiment, the numbers and/or the widths of the slit patterns of the first portion A of the red filter R, the green filter G, and the blue filter B are adjusted so that the display panel 100 may have a light transmittance and a color reproducibility suitable for one or more applications of a transparent display technique.

FIG. 20B is a plan view illustrating a color filter unit 110S according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 20B, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions may include recess portions and halftone portions where the color filters having a second thickness smaller than the first thickness.

The second portions H may be disposed in corner portions of the pixel area OP. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and a trapezoidal shape having an inclined side with respect to the shorter side of the pixel area OP.

The second portions H may be disposed in a plurality of rectangular areas. For example, a first group of the second portions H may be disposed in a first rectangular area disposed in a first corner portion of the pixel area OP. A second group of the second portions H may be disposed in a second rectangular area disposed in a second corner portion of the pixel area OP opposite to the first corner portion in the first direction D1. A third group of the second portions H may be disposed in a third rectangular area disposed in a third corner portion of the pixel area OP opposite to the first corner portion in the second direction D2. A fourth group of the second portions H may be disposed in a fourth rectangular area disposed in a fourth corner portion of the pixel area OP opposite to the first corner portion in the first and second directions D1 and D2. A distance between two groups may be substantially larger than a distance between second portions H in a same group.

The first and fourth groups of the second portions H are defined by first slit patterns having a first inclined angle with respect to the shorter side of the pixel area OP. The second and third groups of the second portions H is defined by second slit patterns having a second inclined angle with respect to the shorter side of the pixel area OP.

The first group of the second portions H and the third group of the second portions H may be symmetrical to each other with respect to a central line of the pixel area OP in the second direction D2. The second group of the second portions H and the fourth group of the second portions H may be symmetrical to each other with respect to the central line of the pixel area OP in the second direction D2. The first group of the second portions H and the second group of the second portions H may be symmetrical to each other with respect to an imaginary central line of the pixel area OP in the first direction D1. The third group of the second portions H and the fourth group of the second portions H may be symmetrical to each other with respect to the imaginary central line of the pixel area OP in the first direction D1.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first to fourth rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portion A of the red filter R, the green filter G, and the blue filter B are adjusted so that the display panel 100 may have a light transmittance and a color reproducibility suitable for one or more applications of a transparent display technique.

FIG. 21 is a plan view illustrating a color filter unit 110T according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 21, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to an imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The second portions H may be disposed in a plurality of right-angled triangular areas. For example, a first group of the second portions H may be disposed in a first right-angled triangular area disposed in a first side with respect to the imaginary central line of the pixel area OP in the second direction D2. A second group of the second portions H may be disposed in a second right-angled triangular area disposed in a second side with respect to the imaginary central line of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP.

The first group of the second portions H and the second group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first and second right-angled triangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 22 is a plan view illustrating a color filter unit 110U according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 22, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to an imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape, a parallelogrammic shape and/or a trapezoidal shape having an inclined side with respect to the shorter side of the pixel area OP.

The second portions H may be disposed in a plurality of right-angled trapezoidal areas. For example, a first group of the second portions H may be disposed in a first right-angled trapezoidal area disposed in a first side with respect to the imaginary central line of the pixel area OP in the second direction D2. A second group of the second portions H may be disposed in a second right-angled trapezoidal area disposed in a second side with respect to the imaginary central line of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP.

The first group of the second portions H and the second group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first and second right-angled trapezoidal areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G and the blue filter B may be adjusted to be same as one another. Alternatively, the sizes of the second portions H of the red filter R, the green filter G and the blue filter B may be adjusted to be different from one another.

According to the present example embodiment, the numbers and/or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 23 is a plan view illustrating a color filter unit 110*y* according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 23, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

Each of the second portions H may have a triangular shape. For example, each of the second portions H may have an equilateral triangular shape. The second portions H may be disposed along the second direction D2.

The light transmittance of the red filter R may be adjusted by adjusting the number of the second portions H. Alternatively or additionally, the light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions H may include through holes or may be through holes. The second portions H are surrounded by the first portion.

Alternatively, the second portions of the green filter G and the blue filter B may include recess portions and halftone portions where the color filters having a second thickness smaller than the first thickness.

The numbers of the second portions H of the red filter R, the green filter G and the blue filter B may be adjusted to be same as one another. Alternatively, the numbers of the second portions H of the red filter R, the green filter G and the blue filter B may be adjusted to be different from one another.

Sizes of the second portions H of the red filter R, the green filter G and the blue filter B may be adjusted to be same as one another. Alternatively, the sizes of the second portions H of the red filter R, the green filter G and the blue filter B may be adjusted to be different from one another.

According to the present example embodiment, the numbers or the sizes of the second portions H of the red filter R, the green filter G, and the blue filter B are adjusted so that the display panel 100 may have a light transmittance and a color reproducibility suitable for one or more applications of a transparent display technique.

FIG. 24 is a plan view illustrating a color filter unit 110W according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2 and 24, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

Each of the second portions H may have a trapezoidal shape. For example, each of the second portions H may have an isosceles trapezoidal shape. The second portions H may be disposed along the second direction D2.

The light transmittance of the red filter R may be adjusted by adjusting the number of the second portions H. Alternatively or additionally, the light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions H may include through holes or may be through holes. The second portions H are surrounded by the first portion.

Alternatively, the second portions of the green filter G and the blue filter B may include recess portions and halftone portions where the color filters having a second thickness smaller than the first thickness.

The numbers of the second portions H of the red filter R, the green filter G, and the blue filter B may be adjusted to be same as one another. Alternatively, the numbers of the second portions H of the red filter R, the green filter G, and the blue filter B may be adjusted to be different from one another.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions H of the red filter R, the green filter G, and the blue filter B are adjusted so that the display panel 100 may have a light transmittance and a color reproducibility suitable for one or more applications of a transparent display technique.

FIG. 25 is a plan view illustrating a color filter unit 110x according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 25, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

Each of the second portions H may have a circular shape. The second portions H may be distributed in an entire area of the pixel area OP. For example, the second portions H may be alternately disposed along the second direction D2.

The light transmittance of the red filter R may be adjusted by adjusting the number of the second portions H. Alternatively or additionally, the light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions H are surrounded by the first portion.

Alternatively, the second portions of the green filter G and the blue filter B may include recess portions and halftone portions where the color filters having a second thickness smaller than the first thickness.

The numbers of the second portions H of the red filter R, the green filter G, and the blue filter B may be adjusted to be same as one another. Alternatively, the numbers of the second portions H of the red filter R, the green filter G, and the blue filter B may be adjusted to be different from one another.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions H of the red filter R, the green filter G, and the blue filter B are adjusted so that the display panel 100 may have a light transmittance and a color reproducibility suitable for one or more applications of a transparent display technique.

FIG. 26 is a plan view illustrating a color filter unit 110Y according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 26, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be distributed in an entire area of the pixel area OP. The second portions H may have an inclined angle with respect to a shorter side of the pixel area OP. The second portions H may be defined by slit patterns of the first portion. The slit patterns may have an inclined angle with respect to the shorter side of the pixel area OP.

The second portions H may be disposed in a plurality of circular areas.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting a size of the circular area in which the second portion is disposed.

Like the red filter R, each of the green filter G and the blue filter B includes a first portion A and a plurality of second portions. The first portion A is a portion where the color filter has a first thickness. The second portions may include through holes or may be through holes. The second portions H are surrounded by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions H of the red filter R, the green filter G and the blue filter B are adjusted so that the display panel 100 may have a light transmittance and a color reproducibility suitable for one or more applications of a transparent display technique.

FIG. 27 is a plan view illustrating a color filter unit 110Z according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 27, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to an imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The second portions H may be disposed in a plurality of right-angled triangular areas. For example, a first group of the second portions H may be disposed in a first right-angled triangular area disposed in a first side with respect to the imaginary central line of the pixel area OP in the second direction D2 and adjacent to the central line of the pixel area OP. A second group of the second portions H may be disposed in a second right-angled triangular area disposed in an upper corner portion of the pixel area OP facing the first right-angled triangular area. A third group of the second portions H may be disposed in a third right-angled triangular area disposed in a second side with respect to the imaginary central line of the pixel area OP in the second direction D2 and adjacent to the central line of the pixel area OP. A fourth group of the second portions H may be disposed in a fourth right-angled triangular area disposed in a lower corner portion of the pixel area OP facing the third right-angled triangular area.

The first and second groups of the second portions H are defined by first slit patterns having a first inclined angle with respect to the shorter side of the pixel area OP. The third and fourth groups of the second portions H are defined by second slit patterns having a second inclined angle with respect to the shorter side of the pixel area OP.

The first group of the second portions H and the third group of the second portions H may be symmetrical to each other with respect to the imaginary central line of the pixel area OP in the second direction D2. The second group of the second portions H and the fourth group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively or additionally, the light transmittance of the red filter R may be adjusted by adjusting sizes of the first to fourth right-angled triangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 28 is a plan view illustrating a color filter unit 111A according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 28, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to a central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a parallelogrammic shape and a trapezoidal shape having an inclined side with respect to the shorter side of the pixel area OP.

The second portions H may be disposed in a plurality of parallelogrammic areas. For example, a first group of the second portions H may be disposed in a first parallelogrammic area disposed in a first side with respect to the imaginary central line of the pixel area OP in the second direction D2. A second group of the second portions H may be disposed in a second parallelogrammic area disposed in a second side with respect to the imaginary central line of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP.

The first group of the second portions H and the second group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively, the light transmittance of the red filter R may be adjusted by adjusting sizes of the first and second parallelogrammic areas in which the second portions H are disposed.

Like the red filter R, each of the green filter G and the blue filter B includes a first portion A and a plurality of second portions. The first portion A is a portion where the color filter has a first thickness. The second portions H may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portion A of the red filter R, the green filter G, and the blue filter B are adjusted so that the display panel 100 may have a light transmittance and a color reproducibility suitable for one or more applications of a transparent display technique.

FIG. 29 is a plan view illustrating a color filter unit 111B according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2 and 29, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to an imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape, a parallelogrammic shape, and/or a trapezoidal shape having an inclined side with respect to the shorter side of the pixel area OP.

The second portions H may be disposed in a plurality of rectangular areas. For example, a first group of the second portions H may be disposed in a first rectangular area disposed in a first side with respect to the central line of the pixel area OP in the second direction D2. A second group of the second portions H may be disposed in a second rectangular area disposed in a second side with respect to the central line of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP. Gaps between the first slit patterns may be non-uniform with each other. For example, a gap between a first slit and a second slit may be different from a gap between the second slit and a third slit.

The first group of the second portions H and the second group of the second portions H may be symmetrical to each other with respect to the imaginary central line of the pixel area OP in the second direction D2.

The light transmittance of the red filter R may be adjusted by adjusting the number of the slit patterns of the first portion A and/or widths of the slit patterns of the first portion. Alternatively, the light transmittance of the red filter R may be adjusted by adjusting gaps between the slit patters of the first portion. Alternatively or additionally, the light transmittance of the red filter R may be adjusted by adjusting sizes of the first and second rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers, the gaps and/or the widths of the slit patterns of the first portion A of the red filter R, the green filter G, and the blue filter B are adjusted so that the display panel 100 may have a light transmittance and a color reproducibility suitable for one or more applications of a transparent display technique.

FIG. 30 is a plan view illustrating a color filter unit 111C according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 30, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The second portions H may be disposed in both sides with respect to an imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP.

The second portions H may be disposed in a plurality of pentagonal areas. For example, a first group of the second portions H may be disposed in a first pentagonal area disposed in a first side with respect to the imaginary central line of the pixel area OP in the second direction D2. A second group of the second portions H may be disposed in a second pentagonal area disposed in a second side with respect to the imaginary central line of the pixel area OP in the second direction D2.

The first group of the second portions H is defined by first slit patterns having a first inclined angle with respect to the shorter side of the pixel area OP. The second group of the second portions H is defined by second slit patterns having a second inclined angle with respect to the shorter side of the pixel area OP.

The first group of the second portions H and the second group of the second portions H may be symmetrical to each other with respect to the central line of the pixel area OP in the second direction D2.

The light transmittance of the red filter R may be adjusted by adjusting the number of the slit patterns of the first portion A and/or widths of the slit patterns of the first portion. Alternatively, the light transmittance of the red filter R may be adjusted by adjusting gaps between the slit patters of the first portion. Alternatively or additionally, the light transmittance of the red filter R may be adjusted by adjusting sizes of the first and second pentagonal areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portion A of the red filter R, the green filter G and the blue filter B are adjusted so that the display panel 100 may have a light transmittance and a color reproducibility suitable for one or more applications of a transparent display technique.

FIG. 31 is a plan view illustrating a color filter unit 111D according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 31, the red filter R includes a first portion A and a plurality of second portions. The first portion A is a portion where the color filter has a first thickness. The second portions may include through holes or may be through holes. The second portions H are defined by the first portion. The second portions H are disposed in a pixel area OP of a display panel 100.

Alternatively, the second portions may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the central line of the pixel area OP in a second direction D2. Each of the second portions H may have a rectangular shape. For example, each of the second portions H may have a square shape. For example, at least one of the second portions H may be disposed in the first domain. In addition, at least one of the second portions H may be disposed in the second domain.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the sizes of the second portions H of the red filter R, the green filter G, and the blue filter B are adjusted so that the display panel 100 may have a light transmittance and a color reproducibility suitable for one or more applications of a transparent display technique.

FIG. 32 is a plan view illustrating a color filter unit 111E according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2 and 32, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the central line of the pixel area OP in a second direction D2. Each of the second portions H may have an octagonal shape. For example, each of the second portions H may have a regular octagonal shape. For example, at least one of the second portions H may be disposed in the first domain. In addition, at least one of the second portions H may be disposed in the second domain.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the sizes of the second portions H of the red filter R, the green filter G, and the blue filter B are adjusted so that the display panel 100 may have a light transmittance and a color reproducibility suitable for one or more applications of a transparent display technique.

FIG. 33 is a plan view illustrating a color filter unit 111F according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 33, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the central line of the pixel area OP in a second direction D2. Each of the second portions H may have a rectangular shape. For example, each of the second portions H may have a square shape. For example, at least one of the second portions H may be disposed in the first domain. In addition, at least one of the second portions H may be disposed in the second domain.

For example, four second portions H may be disposed in the first domain of the pixel area OP in a two by two matrix type. For example, four second portions H may be disposed in the second domain of the pixel area OP in a two by two matrix type.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting the number of the second portions H and sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions H of the red filter R, the green filter G and the blue filter B are adjusted so that the display panel 100 may have a light transmittance and a color reproducibility suitable for one or more applications of a transparent display technique.

FIG. 34 is a plan view illustrating a color filter unit 111G according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 34, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the imaginary central line of the pixel area OP in a second direction D2. The second portions H may have an inclined angle with respect to a shorter side of the pixel area OP. The second portions H may be defined by slit patterns of the first portion. The slit patterns may have an inclined angle with respect to the shorter side of the pixel area OP. Each of the second portions H may have a triangular shape and/or a trapezoidal shape having an inclined side with respect to the shorter side of the pixel area OP. Some of the slit patterns may intersect each other.

The second portions H may be disposed in a plurality of rectangular areas. For example, the second portions H may be disposed in a plurality of square areas. For example, at least one of first rectangular areas in which the second portions H are disposed may be disposed in the first domain. For example, at least one of second rectangular areas in which the second portions H are disposed may be disposed in the second domain. For example, four first rectangular areas are disposed in the first domain in a two by two matrix type. For example, four second rectangular areas are disposed in the second domain in a two by two matrix type.

The second portions H are formed by slit patterns of the first portion A in each of the rectangular areas. The second portions H may have different inclined angles for the respective rectangular areas.

A size of the first rectangular area in the first domain may be different from a size of the second rectangular area in the second domain. For example, when the first domain is larger than the second domain, the first rectangular area in the first domain may be larger than the second rectangular area in the second domain.

The light transmittance of the red filter R may be adjusted by adjusting the number of the slit patterns of the first portion A and/or widths of the slit patterns of the first portion. Alternatively, the light transmittance of the red filter R may be adjusted by adjusting sizes of the first and second rectangular areas in which the second portions H are disposed.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the widths of the slit patterns of the first portions A of the red filter R, the green filter G, and the blue filter B are adjusted so that the display panel 100 may have a light transmittance and a color reproducibility suitable for one or more applications of a transparent display technique.

FIG. 35 is a plan view illustrating a color filter unit 111H according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 35, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the imaginary central line of the pixel area OP in the second direction D2. The second portions H may be disposed in a plurality of rectangular areas. For example, the second portions H may be disposed in a plurality of square areas. For example, at least one of the second portions H may be disposed in the first domain. For example, at least one of the second portions H may be disposed in the second domain.

Each of the second portions H may include a first extending portion extending in a first direction D1, a second extending portion extending in the second direction D2 and a slit patterns extending from the first and second extending portions. The slit patterns may have an inclined angle with respect to a shorter side of the pixel area OP.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the sizes of the second portions of the red filter R, the green filter G, and the blue filter B are adjusted so that the display panel 100 may have a light transmittance and a color reproducibility suitable for one or more applications of a transparent display technique.

FIG. 36 is a plan view illustrating a color filter unit 111I according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 36, the red filter R includes a first portion A and a plurality of second portions. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to an imaginary central line of the pixel area OP in a second direction D2 and a second domain disposed in a second side with respect to the imaginary central line of the pixel area OP. A size of the first domain may be different from a size of the second domain.

The second portions H may be disposed in both sides with respect to the imaginary central line of the pixel area OP in the second direction D2. Each of the second portions H may have a triangular shape. For example, each of the second portions H may have an isosceles triangular shape. For example, at least one of the second portions H may be disposed in the first domain. For example, at least one of the second portions H may be disposed in the second domain.

For example, four second portions H having triangular shapes may be disposed in the first domain of the pixel area OP each having a side disposed parallel to a side of the first domain. Vertexes of four triangular shapes in the first domain may face each other. For example, four second portions H having triangular shapes may be disposed in the second of the pixel area OP. Vertexes of four triangular shapes in the second domain may face each other.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting the numbers of the second portions H or sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions of the red filter R, the green filter G, and the blue filter B are adjusted so that the display panel 100 may have a light transmittance and a color reproducibility suitable for one or more applications of a transparent display technique.

FIG. 37 is a plan view illustrating a color filter unit 111J according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 37, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain disposed in a first side with respect to a central line of the pixel area OP in a second direction D2 and a second domain disposed in a second side with respect to the central line of the pixel area OP. A size of the first domain may be different from a size of the second domain.

The second portions H may be disposed in both sides with respect to the imaginary central line of the pixel area OP in the second direction D2. Each of the second portions H may have a triangular shape. For example, each of the second portions H may have an isosceles triangular shape. For example, at least one of the second portions H may be disposed in the first domain. For example, at least one of the second portions H may be disposed in the second domain.

For example, two second portions H having triangular shapes may be disposed in the first domain of the pixel area OP. Vertexes of four triangular shapes in the first domain may face each other. For example, two second portions H having triangular shapes may be disposed in the second of the pixel area OP. Vertexes of four triangular shapes in the second domain may face each other.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting the numbers of the second portions H or sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions of the red filter R, the green filter G, and the blue filter B are adjusted so that the display panel 100 may have a light transmittance and a color reproducibility suitable for one or more applications of a transparent display technique.

FIG. 38 is a plan view illustrating a color filter unit 111K according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2 and 38, the red filter R includes a first portion A and a plurality of second portions H. The first portion A is a portion where the color filter has a first thickness. The second portions H may include through holes or may be through holes. The second portions H are defined by the first portion. The second portions H are disposed in a pixel area OP of a display panel 100.

Alternatively, the second portions H may include recess portions and halftone portions where the color filters having a second thickness smaller than the first thickness.

The pixel area OP may be divided into a plurality of domains. The pixel area OP may be divided into a first domain and a second domain adjacent to the first domain. A size of the first domain may be different from a size of the second domain.

The second portions H may be disposed in both sides with respect to the central line of the pixel area OP in the second direction D2. Each of the second portions H may have a circular shape. For example, at least one of the second portions H may be disposed in the first domain. For example, at least one of the second portions H may be disposed in the second domain.

For example, four second portions H having circular shapes may be disposed in the first domain of the pixel area OP. Four second portions H having circular shapes may be disposed in the second of the pixel area OP.

A size of the second portion H in the first domain may be different from a size of the second portion H in the second domain. For example, when the first domain is larger than the second domain, the second portion H in the first domain may be larger than the second portion H in the second domain.

The light transmittance of the red filter R may be adjusted by adjusting the numbers of the second portions H or sizes of the second portions H.

Like the red filter R, each of the green filter G and the blue filter B includes a first portion A and a plurality of second portions. The first portion A is a portion where the color filter has a first thickness. The second portions may include through holes or may be through holes. The second portions are defined by the first portion.

Alternatively, the second portions of the green filter G and the blue filter B may include recess portions and halftone portions where the color filters having a second thickness smaller than the first thickness.

Sizes of the second portions H of the red filter R, the green filter G, and the blue filter B may be adjusted to be same as one another. Alternatively, the sizes of the second portions H of the red filter R, the green filter G, and the blue filter B may be adjusted to be different from one another.

According to the present example embodiment, the numbers and/or the sizes of the second portions of the red filter R, the green filter G, and the blue filter B are adjusted so that the display panel 100 may have a light transmittance and a color reproducibility suitable for one or more applications of a transparent display technique.

FIG. 39 is a cross-sectional view illustrating a color filter unit 111L according to an example embodiment of the present invention.

A transparent display apparatus according to the present example embodiment is substantially the same as the transparent display apparatus of the previous example embodiment explained referring to FIGS. 1 to 3D except that the transparent display apparatus further includes an overcoating layer disposed on the color filters R, G and B. Thus, the same reference numerals will be used to refer to the same or like parts as those described in the previous example embodiment of FIGS. 1 to 3D and any repetitive explanation concerning the above elements may be omitted.

Referring to FIGS. 1, 2 and 39, the red filter R includes a first portion A and a second portion H. The first portion A is a portion where the color filter has a first thickness. The second portion may include a through hole or may be a through hole. The second portion H is defined by the first portion. The second portion H is disposed in a pixel area OP of a display panel 100. The second portion H may be disposed in a central portion of the pixel area OP.

Alternatively, the second portion H may include a recess portion and a halftone portion where the color filter has a second thickness smaller than the first thickness.

The first portion A of the red filter R is formed on a base substrate 120 and has the first thickness. The first portion A of the red filter R converts a light filtered by the first portion A of the red filter R into a red light. The first portion A of the red filter R has a first light transmittance.

The second portion H of the red filter R includes a through hole or is a through hole. The second portion H of the red filter R passes a light without substantial conversion. The second portion H of the red filter R has a second light transmittance higher than the first light transmittance.

Like the red filter R, each of the green filter G and the blue filter B includes a first portion A and a second portion. The first portion A is a portion where the color filter has a first thickness. The second portion H may include a through hole or may be a through hole. The second portion is defined by the first portion.

Alternatively, the second portions of the green filter G and the blue filter B H may include recess portions and halftone portions where the color filters having a second thickness smaller than the first thickness.

An overcoating layer 130 is disposed on the red, green, and blue filters R, G, and B. The overcoating layer 130 may include an organic material and may have a substantially level top surface. Differences of heights between the first portions A and second portions of the red, green and blue filters R, G, and B may be compensated by the overcoating layer 130.

According to the present example embodiment, the sizes of the second portions of the red filter R, the green filter G, and the blue filter B are adjusted so that the display panel 100 may have a light transmittance and a color reproducibility suitable for one or more applications of a transparent display technique.

A height of a color filter layer that includes the red filter R, the green filter G, and the blue filter B may be planarized by the overcoating layer 130.

FIG. 40 is a plan view illustrating a color filter unit 111M according to an example embodiment of the present invention.

A transparent display apparatus according to the present example embodiment is substantially the same as the transparent display apparatus of the previous example embodiment explained referring to FIGS. 1 to 3D except for a shape of the first portion A and a shape of the second portion H. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 40, the red filter R includes a first portion A and a second portion HR. The first portion A is a portion where the color filter has a first thickness. The second portion HR may include a through hole or may be a through hole. The second portion HR is defined by the first portion. The second portion HR is disposed in a pixel area OP of a display panel 100. The second portion HR may be disposed in a central portion of the pixel area OP.

Alternatively, the second portion may include a recess portion and a halftone portion where the color filter has a second thickness smaller than the first thickness.

The first portion A of the red filter R is formed on a base substrate 120 and has the first thickness. The first portion A of the red filter R converts a light filtered by the first portion A of the red filter R into a red light. The first portion A of the red filter R has a first light transmittance.

The second portion HR of the red filter R may be a through hole. The second portion HR of the red filter R passes a light without substantial conversion. The second portion HR of the red filter R has a second light transmittance higher than the first light transmittance.

Like the red filter R, each of the green filter G and the blue filter B includes a first portion A and a second portion. The first portion A is a portion where the color filter has a first thickness. The second portions HG and HB of the green filter and the blue filter, respectively, may include through holes or may be through holes. The second portions HG and HB are defined by associated first portions.

Alternatively, the second portions of the green filter G and the blue filter B may include recess portions and halftone portions where the color filters have a second thickness smaller than the first thickness.

In the present example embodiment, at least one of the second portion HR of the red filter R, the second portion HG of the green filter G and the second portion HB of the blue filter B may have a size different from the others. For example, the second portion HR of the red filter R may be smaller than the second portion HG of the green filter G and the second portion HB of the blue filter B. In addition, sizes of the second portion HG of the green filter G and the second portion HB of the blue filter B may be same as each other.

According to the present example embodiment, the sizes of the second portions HR, HG, and HB of the red filter R, the green filter G, and the blue filter B are adjusted so that the display panel 100 may have a light transmittance and a color reproducibility suitable for one or more applications of a transparent display technique.

FIG. 41 is a plan view illustrating a color filter unit 111N according to an example embodiment of the present invention.

A transparent display apparatus according to the present example embodiment is substantially the same as the transparent display apparatus of the previous example embodiment explained referring to FIGS. 1 to 3D except for shapes of the color filters R, G and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 41, the red filter R includes a first portion A and a second portion H. The first portion A is a portion where the color filter has a first thickness. The second portion H may include a through hole or may be a through hole. The second portion H is defined by the first portion. The second portion H is disposed in a pixel area OP of a display panel 100. The second portion H may be disposed in a central portion of the pixel area OP.

Alternatively, the second portion may include a recess portion and a halftone portion where the color filter has a second thickness smaller than the first thickness.

The first portion A of the red filter R is formed on a base substrate 120 in the first thickness. The first portion A of the red filter R converts a light filtered by the first portion A of the red filter R into a red color. The first portion A of the red filter R has a first light transmittance.

The second portion H of the red filter R may be a through hole. The second portion H of the red filter R passes a light without substantial conversion. The second portion H of the red filter R has a second light transmittance higher than the first light transmittance.

Like the red filter R, each of the green filter G and the blue filter B includes a first portion A and a second portion. The first portion A is a portion where the color filter has a first thickness. The second portion may include a through hole or may be a through hole. The second portion H is defined by the first portion.

Alternatively, the second portions of the green filter G and the blue filter B H may include recess portions and halftone portions where the color filters have a second thickness smaller than the first thickness.

In the present example embodiment, at least one of the red filter R, the green filter G, and the blue filter B may have a size different from the others. For example, the red filter R may be larger than the green filter G and the blue filter B.

Sizes of the second portion H of the red filter R, the second portion H of the green filter G and the second portion H of the blue filter B may be same as each other.

According to the present example embodiment, the sizes of the second portions HR, HG and HB of the red filter R, the green filter G and the blue filter B are adjusted so that the display panel 100 may have a light transmittance and a color reproducibility suitable for one or more applications of a transparent display technique.

In addition, the sizes of the red filter R, the green filter G, and the blue filter B are adjusted so that the display panel 100 may have a light transmittance and a color reproducibility suitable for one or more applications of a transparent display technique.

FIG. 42A is a plan view illustrating a color filter unit 111O according to an example embodiment of the present invention. FIG. 42B is a cross-sectional view illustrating a red filter, a light blocking pattern and a overcoating layer cut along a line XIV-XIV' shown in FIG. 42A.

A transparent display apparatus according to the present example embodiment is substantially the same as the transparent display apparatus of the previous example embodiment explained referring to FIGS. 1 to 3D except for shapes of the color filters R, G and B and an overcoating layer disposed on the color filters R, G and B. Thus, the same reference numerals will be used to refer to the same or like parts as those described in the previous example embodiment of FIGS. 1 to 3D and any repetitive explanation concerning the above elements may be omitted.

Referring to FIGS. 1, 2, and 42A, the red filter R includes a first portion A and a second portion H. The first portion A is a portion where the color filter has a first thickness. The second portion may include a through hole (or a void portion) or may be a through hole. The second portion H is defined by the first portion. The second portion H is disposed in a pixel area OP of a display panel 100. The second portion H may be disposed at both end portions of the pixel area OP.

Alternatively, the second portion may include a recess portion and a halftone portion where the color filter has a second thickness smaller than the first thickness.

The first portion A of the red filter R is formed on a base substrate 120 and has the first thickness. The first portion A of the red filter R converts a light filtered by the first portion A of the red filter R into a red light. The first portion A of the red filter R has a first light transmittance.

The second portion H of the red filter R may be a through hole. The second portion H of the red filter R passes a light without substantial conversion. The second portion H of the red filter R has a second light transmittance higher than the first light transmittance.

Like the red filter R, each of the green filter G and the blue filter B includes a first portion A and a second portion. The first portion A is a portion where the color filter has a first thickness. The second portion may include a through hole (or a void portion) or may be a through hole. The second portion is defined by the first portion.

Alternatively, the second portions of the green filter G and the blue filter B may include recess portions and halftone portions where the color filters having a second thickness smaller than the first thickness.

Referring to FIG. 42B, light blocking patterns BP are disposed corresponding to boundaries of the pixel areas OP. The second portions H of the red filter R are disposed adjacent to the light blocking patterns BP. The first portion A of the red filter R does not overlap the light blocking patterns BP.

An overcoating layer OC is disposed on the red filter R and the light blocking filter BP. The overcoating layer OC may include an organic material.

According to the present example embodiment, the sizes of the second portions of the red filter R, the green filter G, and the blue filter B are adjusted so that the display panel 100 may have a light transmittance and a color reproducibility suitable for one or more applications of a transparent display technique.

The first portions A of the red filter, the green filter G, and the blue filter B do not overlap the light blocking patterns BP; advantageously, a thickness of the display panel 100 may be decreased. Furthermore, an AUA (active unfilled area) defect generating a dot stain and a yellowish defect displaying yellow image may be prevented; advantageously, display quality of the display panel 100 may be improved.

FIG. 43 is a cross sectional view illustrating a transparent display apparatus according to an example embodiment of the present invention.

The transparent display apparatus according to the present example embodiment is substantially the same as the transparent display apparatus of the previous example embodiment explained referring to FIGS. 1 to 3D except that the transparent display apparatus illustrated in FIG. 43 does not include a light source and that the transparent display apparatus illustrated in FIG. 43 includes two polarizers disposed on both sides of the display panel. Thus, the same reference numerals will be used to refer to the same or like parts as those described in the previous example embodiment of FIGS. 1 to 3D and any repetitive explanation concerning the above elements may be omitted.

Referring to FIG. 43, the transparent display apparatus includes a display panel 100A, a first polarizer 200 and a second polarizer 250. The transparent display apparatus of the present example embodiment does not include a light source. The transparent display apparatus may be a transmissive display apparatus displaying an image using an external light.

The display panel 100A may include a first substrate (not shown), a second substrate (not shown) and a liquid crystal layer (not shown) disposed between the first and second substrates.

The first substrate may be a TFT substrate. The first substrate may include a pixel layer (not shown) on which a plurality of TFTs disposed in a matrix form and a pixel electrode (not shown).

The second substrate may be a color filter substrate. The second substrate may include a color filter (not shown) representing a color by a light passing the color filter and a common electrode (not shown) facing the pixel electrode.

Alternatively, the color filter may be disposed on the first substrate instead of the second substrate.

The pixel electrode and the common electrode respectively include a transparent material to allow the external light to pass.

The first polarizer 200 is disposed on a first surface of the display panel 100A. The first polarizer 200 may be disposed adjacent to the first substrate of the display panel 100A.

The first polarizer 200 transmits a light having a direction same as a first polarizing axis of the first polarizer 200 and absorbs a light having a direction different from the first polarizing axis of the first polarizer 200. Accordingly, the first polarizer 200 polarizes the external light.

The second polarizer 250 is disposed on a second surface of the display panel 100A opposite to the first surface. The second polarizer 250 may be disposed adjacent to the second substrate of the display panel 100A.

The second polarizer 250 transmits a light having a direction same as a second polarizing axis of the second polarizer 250 and absorbs a light having a direction different from the second polarizing axis of the second polarizer 250. Accordingly, the second polarizer 250 polarizes the light passing through the display panel 100A.

Unlike the transparent display apparatus of the previous example embodiment of FIGS. 1 to 3d, the transparent display apparatus of the present example embodiment includes the first and second polarizers 200 and 250 disposed on both sides of the display panel 100A so that an image is displayed on the display panel 100A. In one or more embodiments, the transparent display apparatus illustrated in FIG. 43 may require an external light with a sufficient strength and a desirable orientation for an image to be desirably displayed on the display panel 100A.

FIG. 44 is a plan view illustrating the display panel 100A of FIG. 43.

Referring to FIG. 44, the display panel 100A includes a plurality of opening portions OP and a blocking portion BP disposed between the opening portions OP to define the opening portions OP. The opening portion OP may be called pixel area. The color filter is disposed at the pixel area OP. The light blocking pattern is disposed at the blocking portion BP.

The color filter includes a red filter R, a green filter G, and a blue filter B. The display panel 100A includes a plurality of color filter units 110 which may be repeated in the display panel 100A. A single color filter unit 110 may include a single red filter R, a single green filter G, and a single blue filter B.

Referring to FIGS. 44, 3A and 3B, the red filter R includes a first portion A and a second portion. The first portion A is a portion where the color filter has a first thickness. The second portion H may include a through hole or a recess portion. The second portion H is surrounded by the first portion. The second portion H is disposed in the pixel area OP of the display panel 100. The second portion H may be disposed in a central portion of the pixel area OP.

According to the present example embodiment, the sizes of the second portions H of the red filter R, the green filter G, and the blue filter B are adjusted so that the display panel 100A may have a light transmittance and a color reproducibility suitable for one or more applications of a transparent display technique.

Alternatively or additionally, the display panel 100A may employ one or more of the color filter units 110A to 111O illustrated in FIGS. 4A to 42B.

For example, the color filters R, G, and B may be formed using a halftone mask of which a light transmittance is adjusted.

For example, the first portions A of the color filters R, G and B may be portions where the color filters have a first thickness. The second portions HT of the color filters R, G, and B may include halftone portions where the color filters have a second thickness smaller than the first thickness.

For example, longer sides of the second portions H and/or HT of the color filters R, G and B may be substantially parallel to longer sides of the color filters R, G, and B. Alternatively, longer sides of the second portions H and/or HT of the color filters R, G, and B may be substantially parallel to shorter sides of the color filters R, G and B.

For example, a plurality of the second portions H and/or HT of the color filters R, G, and B may be disposed in a single pixel area.

For example, the second portions H and/or HT of the color filters R, G, and B may be inclined with respect to the shorter sides of the color filters R, G and B. For example, the second portions H and/or HT of the color filters R, G, and B may be defined as slit patterns of the first portion.

For example, the pixel area OP may be divided into a first domain and a second domain. At least one of the second portions H and/or HT may be disposed in the first domain. At least one of the second portions H and/or HT may be disposed in the second domain. When the first domain is larger than the second domain, the second portion H in the first domain may be larger than the second portion H in the second domain.

For example, the transparent display apparatus may further include an overcoating layer disposed on the first portions A of the color filters R, G, and B and the second portions H and/or HT of the color filters R, G, and B.

For example, at least one of the second portion of the red filter R, the second portion of the green filter G, and the second portion of the blue filter B may have a size different from the others. For example, the second portion of the red filter R may be smaller than the second portion of the green filter G and the second portion of the blue filter B.

For example, at least one of the red filter R, the green filter G, and the blue filter B may have a size different from the others. For example, the red filter R may be larger than the green filter G and the blue filter B. Sizes of the second portion H of the red filter R, the second portion H of the green filter G, and the second portion H of the blue filter B may be same as each other.

According to the present invention as explained above, the transparent display apparatus uses a display panel having a light transmittance and a color reproducibility suitable for one or more applications of a transparent display technique so that a transparent image may be effectively displayed. In addition, a conventional material may be used for manufacturing the color filter. As a result a conventional product line for a non-transparent display apparatus may be used to produce the transparent display apparatus. Advantageously, the manufacturing cost of the transparent display apparatus may not be substantially increased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display apparatus comprising:
    a display panel comprising a color filter including a first portion and a second portion in a pixel area, the first portion having a first light transmittance, the second portion having a second light transmittance higher than the first light transmittance, the first and second portions being in the same color filter;
    a light source providing a light to the display panel;
    a polarizer disposed between the light source and the display and polarizing the light;
    a transparent reflective element spaced apart from the display panel and reflecting an image provided from the display panel; and
    a control part for adjusting at least one of a luminance of the light source and a grayscale of the image to control transparency of the transparent reflective element based on an intensity of an external light.

2. The display apparatus of claim 1, wherein the second portion of the color filter is a hole.

3. The display apparatus of claim 1, wherein the second portion of the color filter is thinner than the first portion.

4. The display apparatus of claim 1, wherein a longer side of the second portion of the color filter is substantially parallel to a longer side of the color filter.

5. The display apparatus of claim 4, wherein the longer side of the second portion of the color filter extends from a first shorter side of the color filter to a second shorter side of the color filter facing the first shorter side.

6. The display apparatus of claim 1, wherein a longer side of the second portion of the color filter is substantially parallel to a shorter side of the color filter.

7. The display apparatus of claim 6, wherein the longer side of the second portion of the color filter extends from a first longer side of the color filter to a second longer side of the color filter facing the first longer side.

8. The display apparatus of claim 1, wherein a plurality of light-transmitting portions of the color filter is disposed in a single pixel area, and light transmittance of each light-transmitting portion of the plurality of light-transmitting portions is higher than the first light transmittance.

9. The display apparatus of claim 8, wherein the light-transmitting portions of the color filter are disposed along a longitudinal direction of the color filter.

10. The display apparatus of claim 1, wherein the transparent reflective element has a curved surface.

11. The display apparatus of claim 1, wherein the transparent reflective element includes a transparent material having a refractive index equal to or greater than 1.

12. The display apparatus of claim 11, wherein the transparent reflective element includes at least one of a glass material, an acrylic material, and a polycarbonate material.

13. The display apparatus of claim 11, wherein a second light provided from the display panel to the transparent reflective element has an incident angle of Brewster's angle, which is $IA = \tan^{-1} n$, where IA is the incident angle and n is the refractive index of the transparent reflective element.

14. The display apparatus of claim 1, wherein a longer side of the second portion of the color filter is inclined with respect to a shorter side of the color filter.

15. The display apparatus of claim 14, wherein the second portion of the color filter is defined as a plurality of slit patterns of the first portion.

16. The display apparatus of claim 1, wherein the pixel area is divided into a first domain and a second domain,
    at least a first part of the second portion of the color filter is disposed in the first domain, and
    at least a second part of the second portion of the color filter is disposed in the second domain.

17. The display apparatus of claim 16, wherein the first part of the second portion in the first domain is larger than the second part of the second portion in the second domain.

18. The display apparatus of claim 1, further comprising an overcoating layer disposed on the first portion of the color filter and the second portion of the color filter.

19. The display apparatus of claim 1, wherein the color filter includes a first filter presenting a first color and a second filter presenting a second color different from the first color, and
    a size of the first filter is different from a size of the second filter.

20. The display apparatus of claim 1, wherein the color filter includes a first filter presenting a first color and a second filter representing a second color different from the first color,
    the first filter includes a first light-filtering portion and a first light-transmitting portion,
    transmittance of the first light-transmitting portion is higher than transmittance of the first light-filtering portion,
    the second filter includes a second light-filtering portion and a second light-transmitting portion,
    transmittance of the second light-transmitting portion is higher than transmittance of the second light-filtering portion, and
    a size of the second light-transmitting portion is different from a size of the first light-transmitting portion.

21. A display apparatus comprising:
    a display panel comprising a color filter including a first portion and a second portion in a pixel area, the first portion having a first light transmittance, the second portion having a second light transmittance higher than the first light transmittance, the first and second portions being in the same color filter;

a first polarizer disposed on a first surface of the display panel, polarizing an external light to generate a polarized light and providing the polarized light to the display panel; and a transparent reflective element spaced apart from the display panel and having a curved surface for reflecting and for magnifying or reducing an image provided from the display panel.

22. The display apparatus of claim 21, wherein the second portion of the color filter is a hole.

23. The display apparatus of claim 21, wherein the second portion of the color filter is thinner than the first portion.

24. The display apparatus of claim 21, wherein a longer side of the second portion of the color filter is substantially parallel to a longer side of the color filter.

25. The display apparatus of claim 21, wherein a longer side of the second portion of the color filter is substantially parallel to a shorter side of the color filter.

26. The display apparatus of claim 21, wherein a plurality of light-transmitting portions of the color filter is disposed in a single pixel area, and light transmittance of each light-transmitting portion of the plurality of light-transmitting portions is higher than the first light transmittance.

27. The display apparatus of claim 21, wherein a longer side of the second portion of the color filter is inclined with respect to a shorter side of the color filter.

28. The display apparatus of claim 27, wherein the second portion of the color filter is defined as a plurality of slit patterns of the first portion.

29. The display apparatus of claim 21, wherein the pixel area is divided into a first domain and a second domain, at least a first part of the second portion of the color filter is disposed in the first domain, and at least a second part of the second portion of the color filter is disposed in the second domain.

30. The display apparatus of claim 29, wherein the first part of the second portion in the first domain is larger than the second part of the second portion in the second domain when the first domain is larger than the second domain.

31. The display apparatus of claim 21, further comprising an overcoating layer disposed on the first portion of the color filter and the second portion of the color filter.

32. The display apparatus of claim 21, wherein the color filter includes a first filter presenting a first color and a second filter presenting a second color different from the first color, and a size of the first filter is different from a size of the second filter.

33. The display apparatus of claim 21, wherein the color filter includes a first filter presenting a first color and a second filter presenting a second color different from the first color, and the first filter includes a first light-filtering portion and a first light-transmitting portion, transmittance of the first light-transmitting portion is higher than transmittance of the first light-filtering portion, the second filter includes a second light-filtering portion and a second light-transmitting portion, transmittance of the second light-transmitting portion is higher than transmittance of the second light-filtering portion, and a size of the second light-transmitting portion is different from a size of the first light-transmitting portion.

34. The display apparatus of claim 21, further comprising a control part for adjusting a grayscale of the image to control transparency of the transparent reflective element.

* * * * *